(12) United States Patent
Wong et al.

(10) Patent No.: US 9,866,247 B2
(45) Date of Patent: Jan. 9, 2018

(54) COMMUNICATIONS DEVICES, INFRASTRUCTURE EQUIPMENT AND METHODS

(71) Applicant: SONY CORPORATION, Tokyo (JP)

(72) Inventors: Shin Horng Wong, Basingstoke (GB); Martin Warwick Beale, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/615,087

(22) Filed: Jun. 6, 2017

(65) Prior Publication Data

US 2017/0279472 A1 Sep. 28, 2017

Related U.S. Application Data

(63) Continuation of application No. PCT/EP2017/052454, filed on Feb. 3, 2017.

(30) Foreign Application Priority Data

Feb. 5, 2016 (EP) .................................... 16154582

(51) Int. Cl.
*H04B 1/06* (2006.01)
*H04W 4/00* (2009.01)
(Continued)

(52) U.S. Cl.
CPC ................ *H04B 1/06* (2013.01); *H04L 1/08* (2013.01); *H04L 67/12* (2013.01);
(Continued)

(58) Field of Classification Search
CPC ............... H04W 4/005; H04W 72/042; H04W 72/0446; H04W 72/048; H04L 1/08; H04L 1/1816
See application file for complete search history.

(56) References Cited

U.S. PATENT DOCUMENTS

2010/0232542 A1* 9/2010 Miyoshi ................ H04L 1/0041
375/295
2015/0131579 A1* 5/2015 Li ............................ H04L 1/08
370/329

(Continued)

OTHER PUBLICATIONS

ZTE "Uplink Data Channel with 15 kHz Subcarrier Spacing for NB-IoT", 3GPP Draft; R1-160053 NB-PUSCH 15 Khz, 3$^{rd}$ Generation Partnership Project (3GPP), Mobile Competence Centre; 650, Route Des Lucioles; F-06921 Sophia-Antipolis Cedex, France, vol. RAN WG1 No. Budapest, HU Jan. 18, 2016-Jan. 20, 2016 Jan. 11, 2016 pp. 1-6.

(Continued)

*Primary Examiner* — Aristocratis Fotakis
(74) *Attorney, Agent, or Firm* — Oblon, McClelland, Maier & Neustadt, L.L.P.

(57) ABSTRACT

A communications device including a receiver configured to receive a plurality of sub-units of an encoded transport block of data in a plurality of time-divided units within frequency resources of a wireless access interface allocated to the mobile terminal, each of the sub-units being received a repeated number of times within a repetition cycle; and circuitry configured to combine a same sub-unit received the repeated number of times to form a composite sub-unit to recover the transport block.

26 Claims, 14 Drawing Sheets

(51) Int. Cl.
*H04L 1/08* (2006.01)
*H04L 29/08* (2006.01)
*H04W 72/04* (2009.01)

(52) U.S. Cl.
CPC ........ *H04W 72/042* (2013.01); *H04W 72/048* (2013.01); *H04W 72/0446* (2013.01); *H04W 72/0453* (2013.01)

(56) References Cited

U.S. PATENT DOCUMENTS

| | | | | |
|---|---|---|---|---|
| 2015/0181576 | A1* | 6/2015 | Papasakellariou | H04L 5/0053 370/329 |
| 2015/0208415 | A1* | 7/2015 | Xu | H04L 5/001 370/329 |
| 2015/0270931 | A1* | 9/2015 | Sun | H04L 1/0072 370/329 |
| 2015/0341956 | A1* | 11/2015 | Sun | H04L 1/0046 370/329 |
| 2015/0358193 | A1* | 12/2015 | Lorca Hernando | H04L 27/2695 370/329 |
| 2017/0164335 | A1* | 6/2017 | Yamamoto | H04W 72/042 |
| 2017/0181135 | A1* | 6/2017 | Chen | H04W 72/042 |

OTHER PUBLICATIONS

ZTE: "Consideration on NB-PDSCH design for NB-IoT", 3GPP Draft; R1-160048 NB-PDSCH, $3^{rd}$ Generation Partnership Project (3GPP) Mobile Competence Centre; 650, Route Des Lucioles; F-06921 Sophia-Antipolis Cedex; France vol. RAN WG1 No. Budapest, HU Jan. 18, 2016-Jan. 20, 2016 Jan. 11, 2016 pp. 1-7.
Panasonic: "NB-IoT PUSCH link level evaluation", 3GPP Draft; R1-160061, $3^{rd}$ Generation Partnership Project (eGPP), mobile Competence Centre; 650, Route Des Lucioles; F-06921 Sophia-Antipolis Cedex; France vol. RAN WG1 Budapest, HU, Jan. 18, 2016-Jan. 20, 2016—Jan. 12, 2016 pp. 1-3.
Qualcomm Incorporated New Network Item: NarrowBand IOT (NB-IOT), 3GPP TSG RAN Meeting #69, Phoenix, USA, Sep. 14-16, 2016 RP-151621, 9 pages.
3GPP TSG RAN WG1 #83, Anaheim, USA Nov. 15-22, 2015, R1-157783 "Way Forward on NB-IoT", 3 pages.
Harri Holma and Antti Toskala, LTE for UMTS OFDMA and SC-FDMA Based Radio Access, Wiley Lte., System Architecture Based on 3GPP SAE pp. 25-27, 2009, ISBN 978-0-470-99401-6.

* cited by examiner

COMMUNICATIONS DEVICES, INFRASTRUCTURE EQUIPMENT AND METHODS

CROSS REFERENCE TO RELATED APPLICATIONS

This application is a continuation of International Application No. PCT/EP2017/052454, filed Feb. 3, 2017, which claims priority to European patent application 16154582.7, filed Feb. 5, 2016, the contents of which are herein incorporated by reference.

FIELD OF DISCLOSURE

The present disclosure relates to a communications device, which is configured to transmit uplink signals to an infrastructure equipment of a mobile communications network via a wireless access interface or to receive downlink signals from an infrastructure equipment. The present disclosure also relates to an infrastructure equipment of a mobile communications network, which is configured to transmit downlink signals to a communications device via a wireless access interface or to receive uplink signals from a communications device.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation wireless communications systems, such as those based on the third generation project partnership (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

SUMMARY OF THE DISCLOSURE

According to one example embodiment of the present technique, a communications device comprises a transmitter configured to transmit signals to an infrastructure equipment of a wireless communications network in accordance with a wireless access interface provided by the infrastructure equipment. The communications device also comprises a controller configured to control the transmitter to transmit data to the infrastructure equipment via an uplink of the wireless access interface, wherein the wireless access interface includes communications resources for allocation to the communications device on the uplink, the communications resources comprising frequency resources, and time resources in which the wireless access interface is divided into predetermined time-divided units. The controller is configured in combination with the transmitter to divide an encoded transport block of data into a plurality of sub-units for transmission in a plurality of the time-divided units and one or more of the frequency resources of the wireless access interface allocated to the communications device, to transmit each sub-unit a repeated number of times within a repetition cycle, and to transmit each sub-unit the repeated number of times in one or more subsequent repetition cycles, each sub-unit being transmitted the repeated number of times whereby the infrastructure equipment can combine the same sub-unit within each repetition cycle to form a composite sub-unit for each of the repetition cycles for recovering the transport block. The repeated number of times may be different for each sub-unit in the same repetition cycle and may be different between repetition cycles. Furthermore embodiments of the present technique find application with both the uplink and the downlink as explained below.

Embodiments of the present technique can provide an arrangement in which repeated transmission of the sub-units can allow a receiver to accumulate signal energy for each received symbol to increase a signal-to-noise ratio in order to be able to decode a transport block. Furthermore, because the sub-units are transmitted repeatedly in each of one or more repetition cycles a receiver can terminate a reception process early, if the receiver is able to decode the encoded transport block after one or more of the repetition cycles without requiring all of the repetition cycles over which an encoded data unit is transmitted.

Embodiments of the present technique may find application for example with NB-IoT in which frequency resources allocated to a NB-IoT device may be limited to only one physical resource block (PRB). As such transmission of large transport blocks may require a transmission time interval (TTI) of longer than that of a sub-frame. Embodiments of the present technique can therefore allow a UE receiver in accordance with NB-IoT to perform symbol combining, cross subframe channel estimation and early termination when repetition is used for transport blocks requiring TTIs of greater than 1 subframe. Further respective aspects and features are defined by the appended claims. The repeated transmissions of the sub-units allows for an accumulation of signal energy at the receiver, such that it has sufficient signal-to-noise ratio in order to be able to decode an encoded transport block.

It should be readily appreciated that embodiments of the present technique apply equally to downlink communications as they do to uplink communications. In other words, having regard to the above described example embodiment, the infrastructure equipment is configured to divide the encoded transport block of data into the plurality of sub-units for transmission in the plurality of the time-divided units and one or more of the frequency resources of the wireless access interface allocated to the communications device, to transmit each sub-unit the repeated number of times within the repetition cycle, and to transmit each sub-unit the repeated number of times in the one or more subsequent repetition cycles, each sub-unit being transmitted the repeated number of times. In this case then, the communications device would receive the repeated sub-units from the infrastructure equipment, and the communications device can combine the same sub-unit within each repetition cycle to form the composite sub-unit for each of the repetition cycles for recovering the transport block.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System

Figure 1:
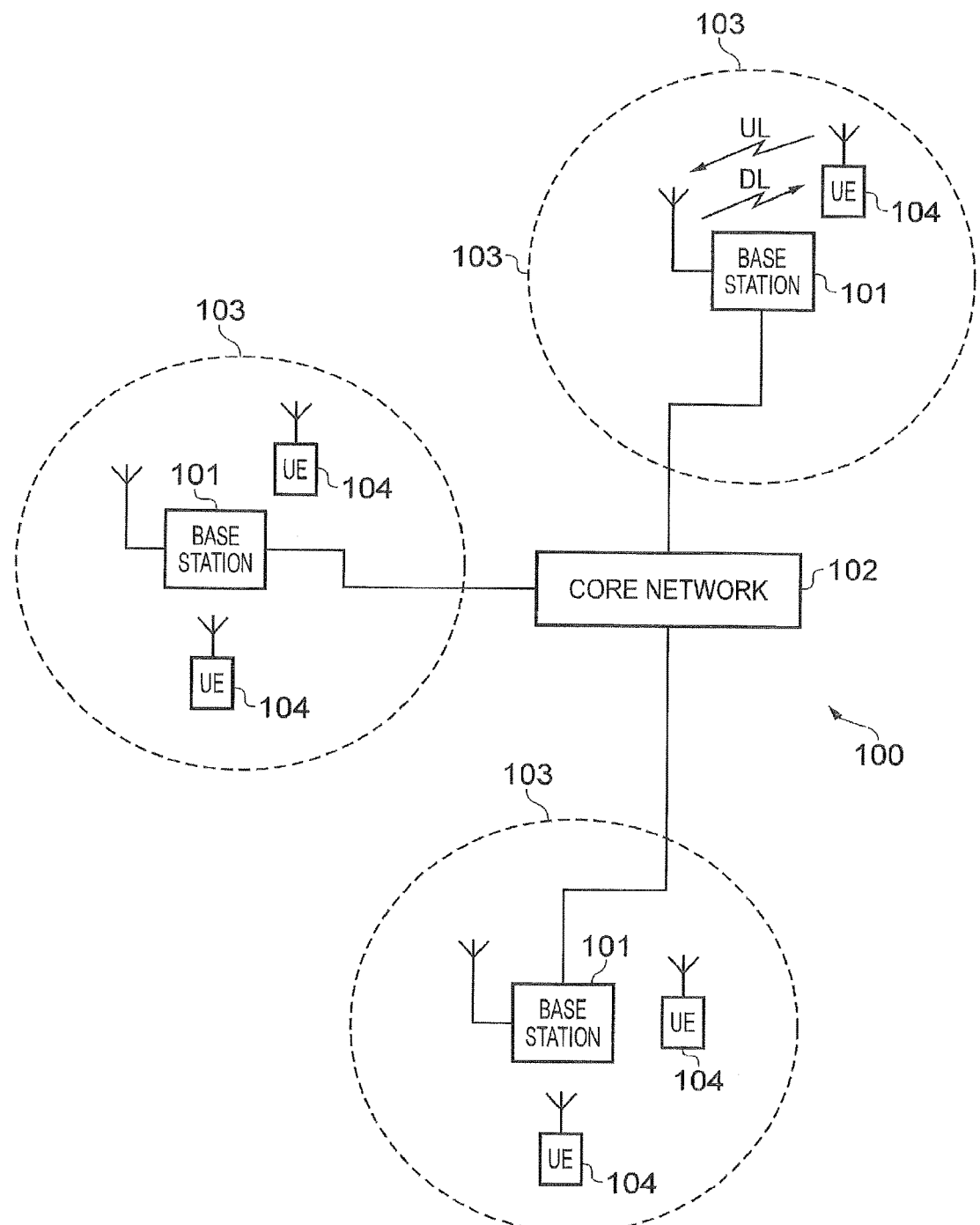
FIG. 1 is a schematic block diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations /NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
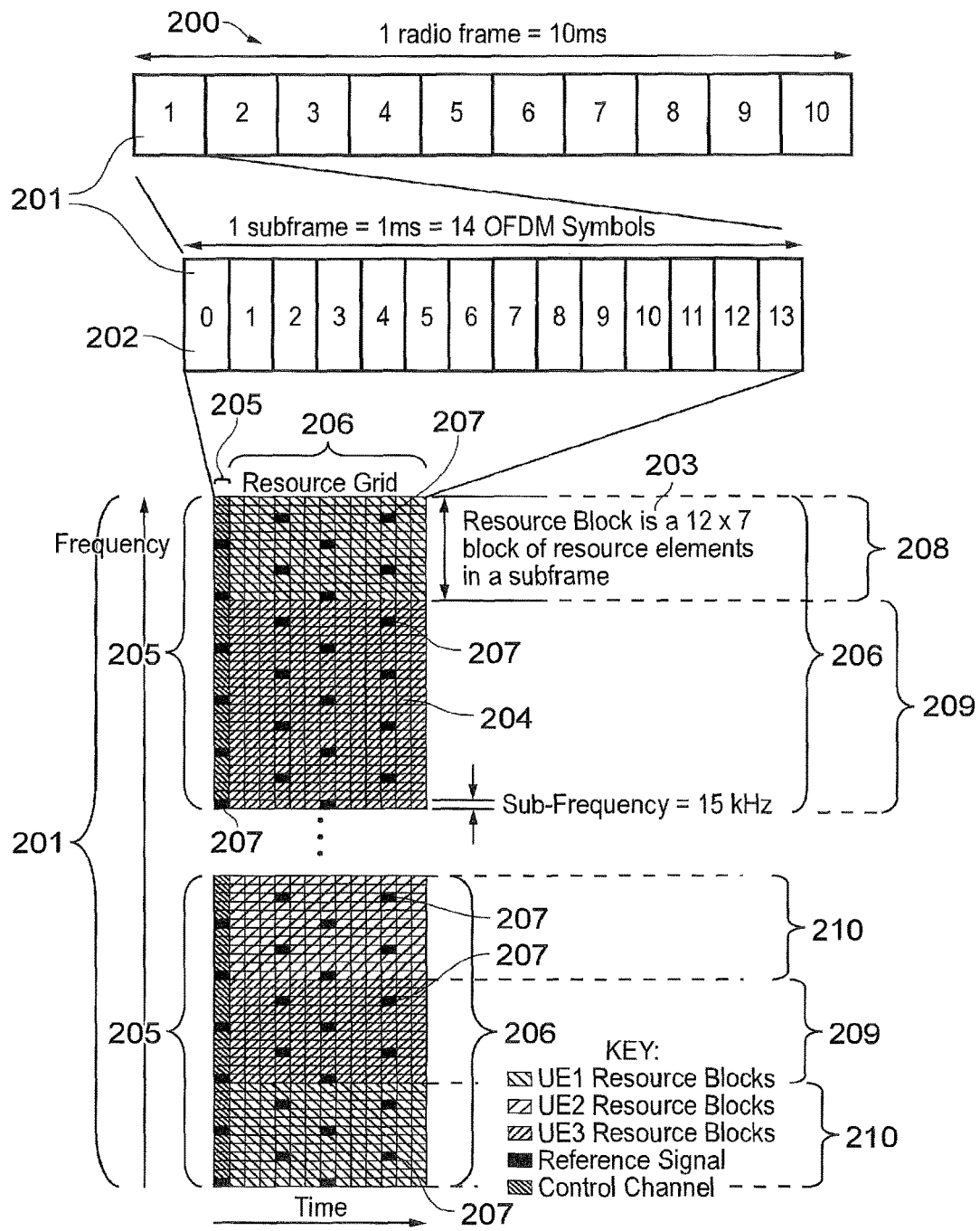
FIG. 2 is a schematic representation illustrating a frame structure of a down-link of a wireless access interface according to an LTE standard.

FIG. 2 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into 128 to 2048 orthogonal subcarriers for example. Each subcarrier bandwidth may take any value but in LTE it is conventionally fixed at 15 kHz. However it has been proposed in the future [2] [3] to provide also a reduced subcarrier spacing of 3.75 kHz for certain parts of the LTE wireless access interface for both the uplink and the downlink. As shown in FIG. 2, the resources of the wireless access interface are also temporally divided into frames where a frame 200 lasts 10 ms and is subdivided into 10 sub-frames 201 each with a duration of 1 ms. Each sub-frame is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

Figure 3:
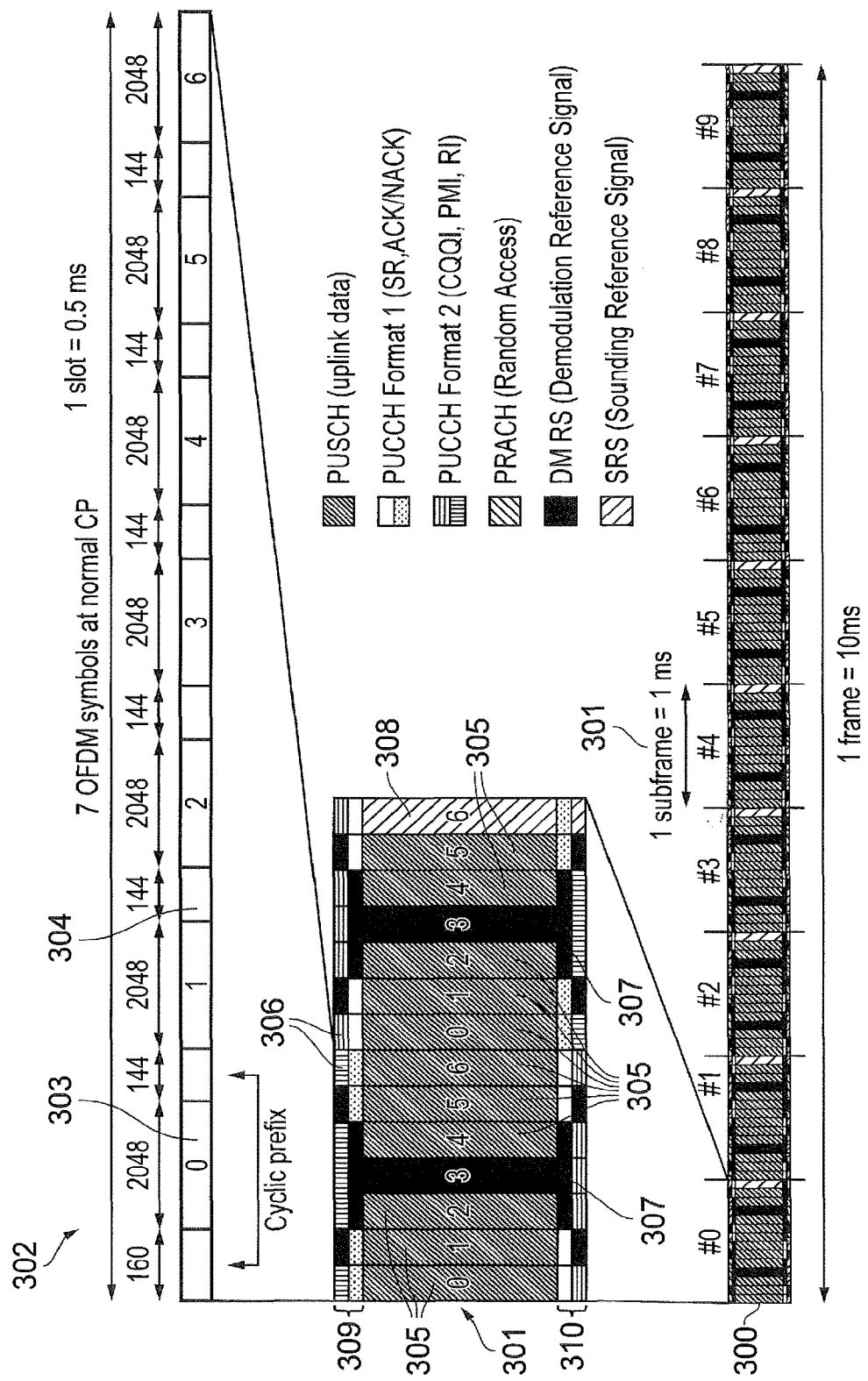
FIG. 3 is a schematic representation illustrating a frame structure of an up-link of wireless access interface according to an LTE standard.

FIG. 3 provides a simplified schematic diagram of the structure of an uplink of an LTE wireless access interface that may be provided by or in association with the eNB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. In FIG. 3 a normal cyclic prefix is used and therefore there are seven OFDM symbols within a sub-frame, however, if an extended cyclic prefix were to be used, each slot would contain only six OFDM symbols. The resources of the uplink sub-frames are also divided into resource blocks and resource elements in a similar manner to downlink sub-frames. More details of the LTE up-link represented in FIG. 3 are provided in Annex 1.

Narrowband Internet of Things

As explained above, it has been proposed to develop an adaptation of a mobile communications network to accommodate narrow band communications within an existing wireless access interface which has been developed to provide broadband wireless communications. For example, in 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier In conventional LTE systems data is transmitted on both the uplink and the downlink, by dividing the data into blocks, known as transport blocks (TB) and transmitted within a Transmission Time Interval (TTI). The TTI in LTE is fixed to 1 ms or one sub-frame. Thus the size of the transport block is determined by the amount of data, which can be transmitted in a sub-frame. If a large Transport Block Size (TBS) needs to be transmitted, more frequency resources, in the form of Physical Resource Blocks (PRB)s can be used, since the time resource is fixed (to 1 ms).

Figure 4:
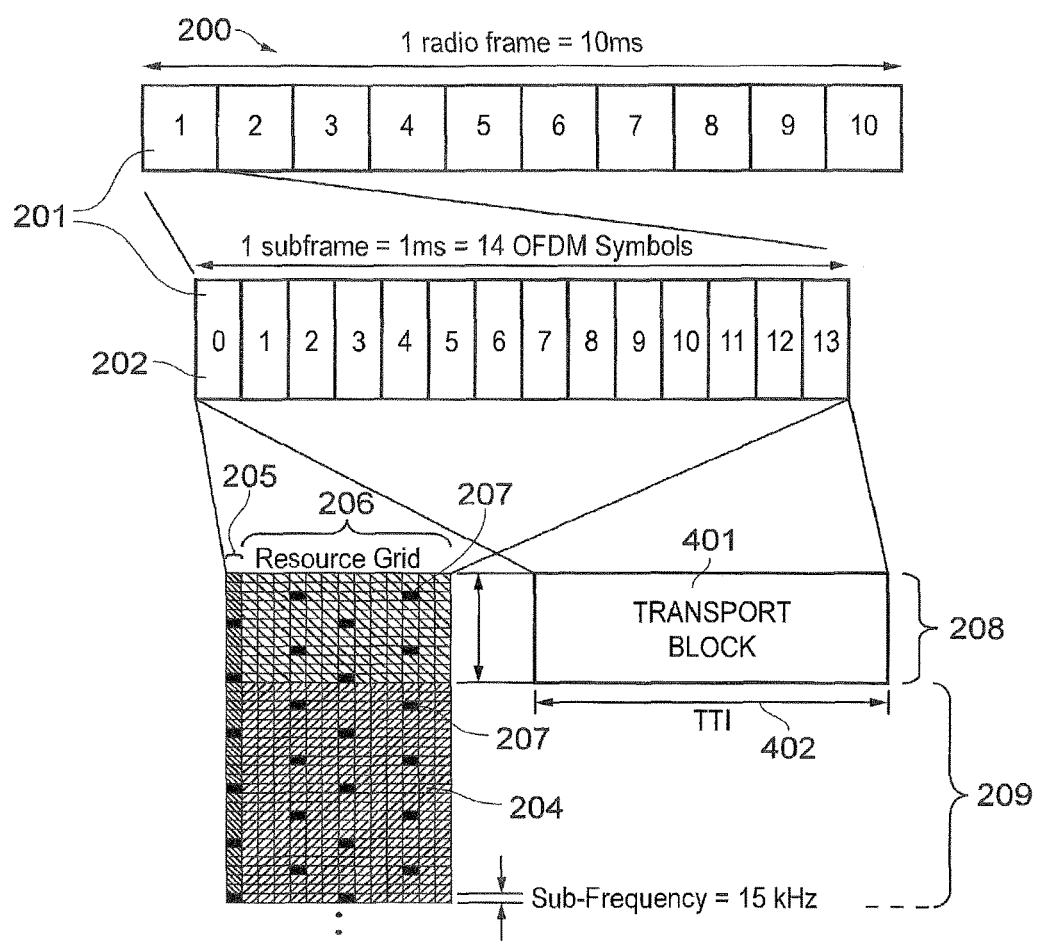
FIG. 4 is a schematic block diagram presenting the downlink frame structure shown in FIG. 2 but also showing a transmission of a transport block within one physical resource block of an LTE wireless access interface.

FIG. 4 provides an illustration of a conventional arrangement in which a transport block (TB) is transmitted on the LTE downlink to a UE. FIG. 4 corresponds to the diagram shown in FIG. 2 and so like features have the same references and only the differences to FIG. 2 will be described. As shown in FIG. 4 within a twelve subcarrier physical resource block (PRB) 208, an allocation is made for transmitting a TB. As shown in FIG. 4 the physical resource block 401 has a size corresponding to the twelve subcarriers of the sub-frame and transports a transport block that is transmitted in one sub-frame. Accordingly, the transmission time interval, TTI, 402 is one millisecond corresponding to the sub-frame duration.

As explained above, it has been proposed that an NB-IoT communications system supports a bandwidth of only 180 kHz (or 1 PRB) for data transmission in the downlink and uplink. As such, if the LTE TTI of 1 ms is used, the number of resource elements (REs) available for data is limited. For example, in the downlink, if the first 3 OFDM symbols are used for LTE Control Regions, and assuming 16 REs are used for NB-RS (reference symbols for the NB-IoT channels) and 24 REs (4 access ports) are used for LTE, the number of REs left for data is 100. For QPSK modulation this would be able carry 200 physical channel bits. If a 1/3 code rate is used and a 24 bit CRC is applied, then 1 PRB can only carry a Transport Block size of 42 bits.

In one example a maximum transport block size for NB-IoT is not greater than 520 bits. In LTE, a large TB would be carried by several PRB in a sub-frame. However, as NB-IoT has only 1 PRB in a sub-frame if the TTI is maintained at 1 ms, segmentation of the TB into smaller TBs is required. Since each TB segment incurs overhead, segmentation is not an efficient way of transmitting a large TBS. Alternatively, a TTI longer than 1 sub-frame can be used to carry a large TBS, which avoids segmentation. Hence instead of carrying the large TBS using multiple PRBs, in NB-IoT the large TBS is carried over multiple sub-frames (i.e. the TTI is spread over multiple sub-frames). Transmitting a transport block over multiple sub-frames is illustrated in FIG. 5.

Figure 5:
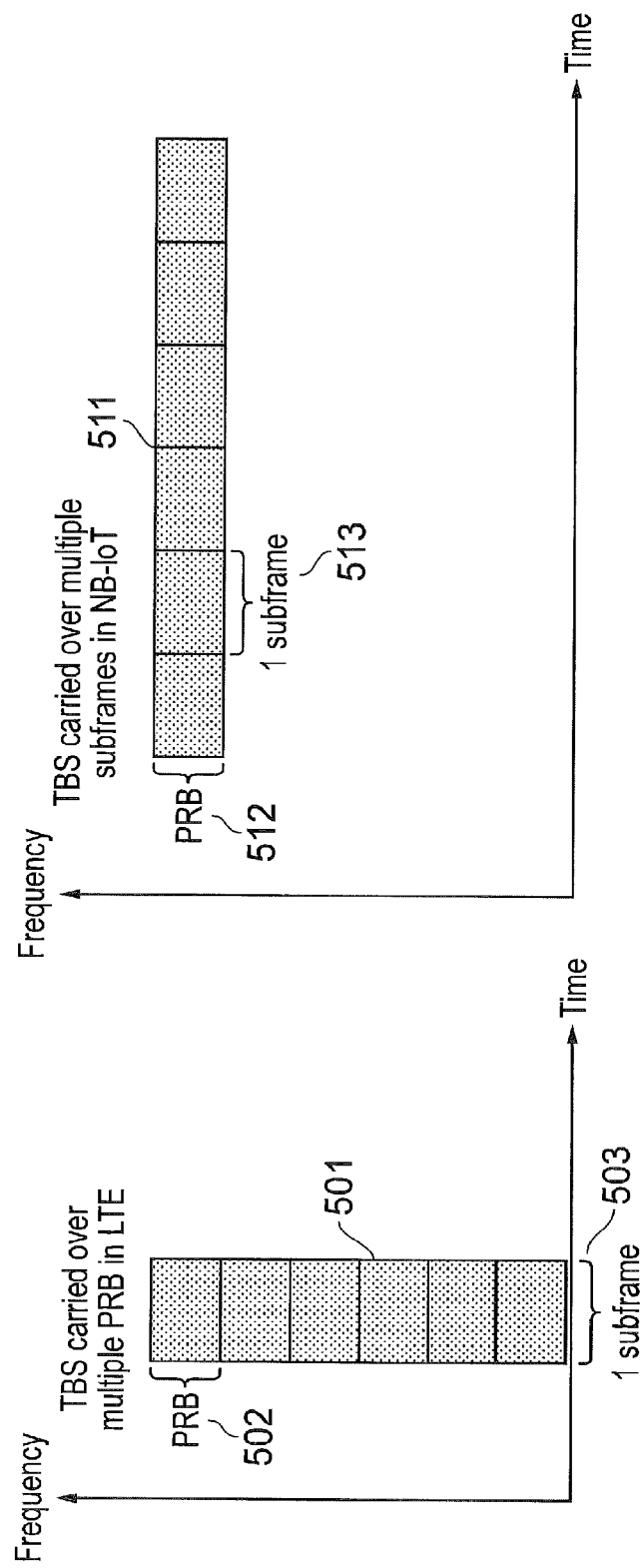
FIG. 5 illustrates how transport blocks may be spread in LTE or in NB-IoT.

As illustrated in FIG. 5, a TB with a large transport block size 501 may be in LTE carried over a single sub-frame 503. In order to do this, the TB is split into six PRBs 502, and as such the TB is communicated during a single time period using multiple frequency resources. Alternatively, a TB with a large TBS 511 may be in NB-IoT carried over multiple sub-frames 513, but use a single PRB 512. As such, the TB is communicated over multiple time periods, but within a single frequency resource.

One of the objectives of NB-IoT is to provide extended coverage of up to 20 dB. The main mechanism to extend coverage is to perform numerous repetitions of the message, such that the receiver can accumulate the signal energy over the repetitive samples in order for it to have a sufficient signal-to-noise ratio (SNR) to decode the message. Symbol combining is one implementation used in 3GPP Release 13 eMTC (enhanced machine type communications) where the repetitive samples are combined at the symbol level. This has a low complexity since the repetition decoding (for SNR accumulation) can be done at the "symbol processing" level, rather than at the LLR (logarithmic-likelihood ratio) level. More baseband processing is required to generate LLRs than to demodulate symbols, and as such there are advantages in terms of complexity and power saving possible from performing symbol processing instead of LLR processing.

Symbol combining requires that the signal (i.e. symbols) in each repetitive sample be exactly the same; i.e. each RE contains the same modulation symbols. In addition to symbol combining, cross sub-frame channel estimation is also used where the signals applied to the RS (reference symbols or reference signals) are also not changed, so that the RS can be combined over several repetitive samples before channel estimation is performed. Using the symbol combining method, the number of samples that can be combined (for channel estimation and further decoding purposes) depends on the radio channel and the frequency tracking capability of the UE.

Symbol combining is only possible over a time period over which the radio channel does not change significantly, in terms of, for example, the coherence time of the channel. If symbol combining is performed over a longer period of time, symbols are combined non-coherently, leading to a loss in performance. Symbol combining is further only possible over a time period over which the phase of the UE's local oscillator does not change significantly with respect to the phase of the eNodeB's oscillator. At low SNRs, frequency estimation at the UE becomes less reliable, leading to greater disparity between the phase of the UE's local oscillator and the phase of the eNodeB's oscillator.

Figure 6:
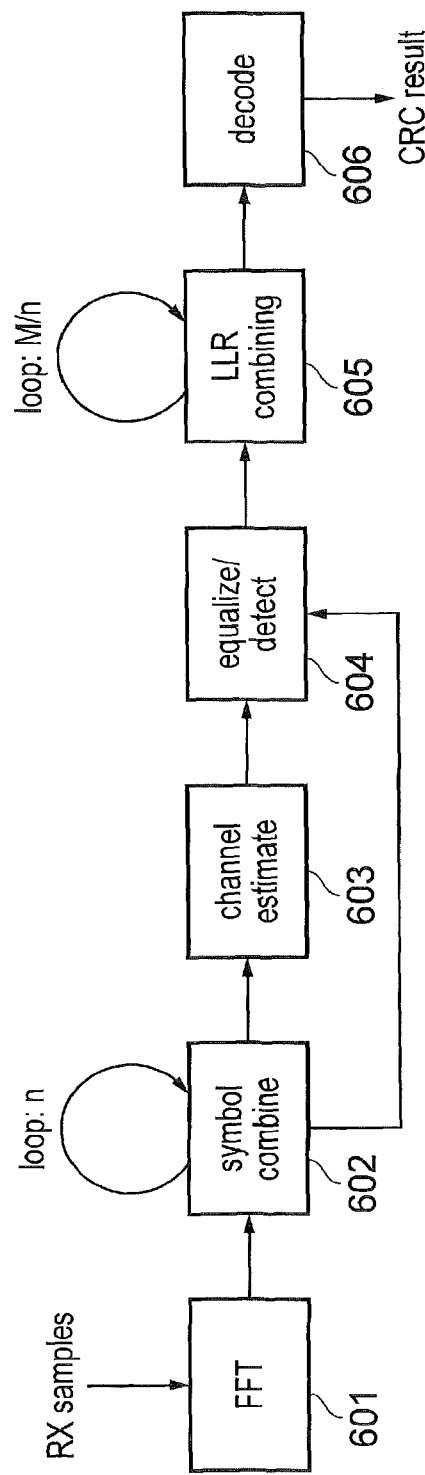
FIG. 6 is a block diagram representation of a receiver architecture for decoding an LTE or NB-IoT repetition coded physical channel.

FIG. 6 shows a receiver architecture for decoding an LTE or NB-IoT repetition coded physical channel A fast Fourier transform (FFT) 601 is carried out on received samples, which converts the received samples into a representation in the frequency domain. The receiver architecture is parameterized to decode a physical channel with 'M' times repetition. The decoder performs symbol combining over 'n' sub-frames 602 and, following channel estimation 603 and equalisation 604, performs LLR combining over 'M/n' sub-frames 605. Once LLR combining has been completed, the receiver may decode the samples 606, and produce an output including a cyclic redundancy check (CRC). The number 'n' of sub-frames over which the UE performs symbol combining may be determined as a function of: (1) the number of sub-frames over which it is known that the received signal does not change, (2) knowledge of the rate of change of the channel and (3) assumptions about the potential frequency offset between the UE and the eNodeB.

Figure 7:
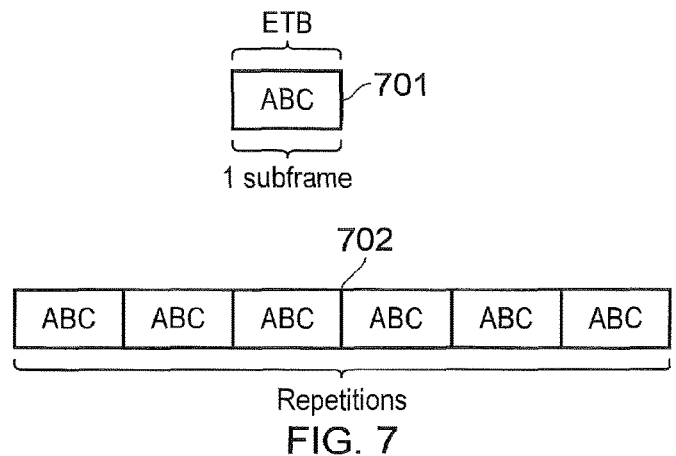
FIG. 7 illustrates a coded transport block consisting of a string of bits fully contained in one sub-frame which may be repeated at the Transmission Time Interval (TTI) level.

For a TTI of 1 sub-frame, cross sub-frame channel estimation and symbol combining can be easily implemented for a repeated signal, since the TB is fully contained within 1 sub-frame and therefore the transmitter need only transmit the same signal in each sub-frame. This is demonstrated in FIG. 7. A coded TB 701 consists of a string of bits, labelled "ABC" (e.g. for a 300 bit encoded transport block, "A" represents the first 100 bits of the encoded transport block, "B" represents the second 100 bits of the encoded transport block and "C" represents the last 300 bits of the encoded transport block. The encoded transport block consists of a set of parity bits, and potentially systematic bits, produced by an error control coding function, such as a Turbo coder or a convolutional coder. The encoded transport block bits may have been rate matched, e.g. punctured or repeated, by a rate matching function). Repetition at the TTI level would produce sub-frames 702 with identical symbols, and as such combining these at the receiver at the symbol level would be straightforward.

Figure 8:
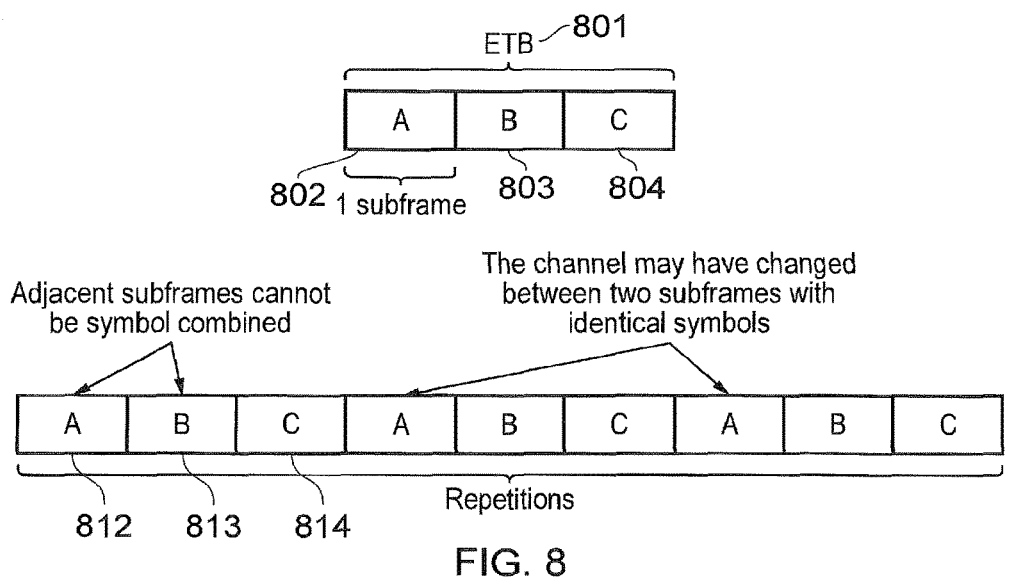
FIG. 8 illustrates a coded transport block consisting of a string of bits spread over multiple sub-frames, which may be repeated at the TTI level.

However, if the TB is spread over multiple sub-frames, repetition at the TTI level would lead to adjacent sub-frames having different symbols and these cannot be combined at symbol level. This is shown in FIG. 8. A coded TB 801 is spread over multiple sub-frames, the first of which contains the bits "A" 802, the second contains the bits "B" 803 and the third contains the bits "C" 804. Repetition at the TTI level would produce sub-frames where adjacent subframes 812, 813, 814 do not contain identical symbols, and therefore cannot be symbol combined. For non-adjacent sub-frames that have the same symbols, the channel may not be the same for cross sub-frame channel estimation purposes, or there may be significant phase disparity between transmitter and receiver, if the separation between these two sub-frames is large, and therefore the receiver may not be able to symbol combine the identical non-adjacent symbols either.

Figure 9:
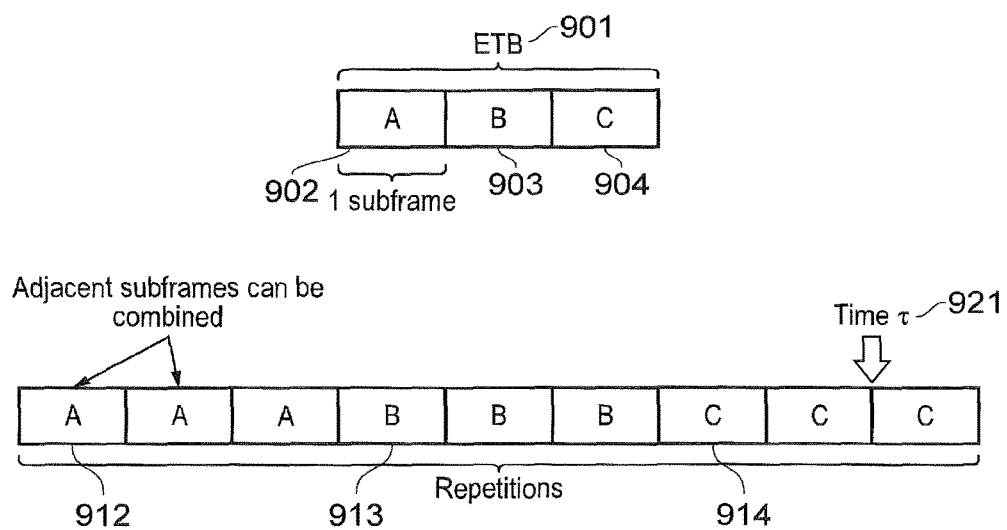
FIG. 9 illustrates how repetition can be performed at the sub-frame level for a coded transport block consisting of a string of bits spread over multiple sub-frames.

One way to overcome this problem is to perform repetition at the sub-frame level for transport blocks with a TTI of greater than 1 sub-frame. This is shown in FIG. 9. An encoded TB (ETB) 901 is spread over multiple sub-frames, the first of which contains the bits "A" 902, the second contains the bits "B" 903 and the third contains the bits "C" 904. Repetition at the sub-frame level of each group of bits would produce sub-frames where adjacent symbols 912 (three "A"s), 913 ("B"s) and 914 ("C"s) are identical, and therefore it is possible to symbol combine them, with a far lower possibility of the channel changing between identical symbols. However, a drawback of the technique shown in FIG. 9 is that if the number of repetitions is large, for example if 100 repetitions are required, then the UE would have to wait for the subframes containing the last group of bits "C" to start before it can start demodulating the ETB. If the UE is experiencing good channel conditions, then this method prevents the UE from early termination of decoding the transport block. For example in FIG. 9, if the UE requires only two repetitions, it will have to wait till time τ 921 in order to collect two repetitive samples from each part of the ETB. When the number of repetitions required is one hundred, the UE will not be able to start demodulating the ETB until after 202 sub-frames have been received. Unlike in the present technique, the example of FIG. 9 does not allow for early termination.

Figure 10:
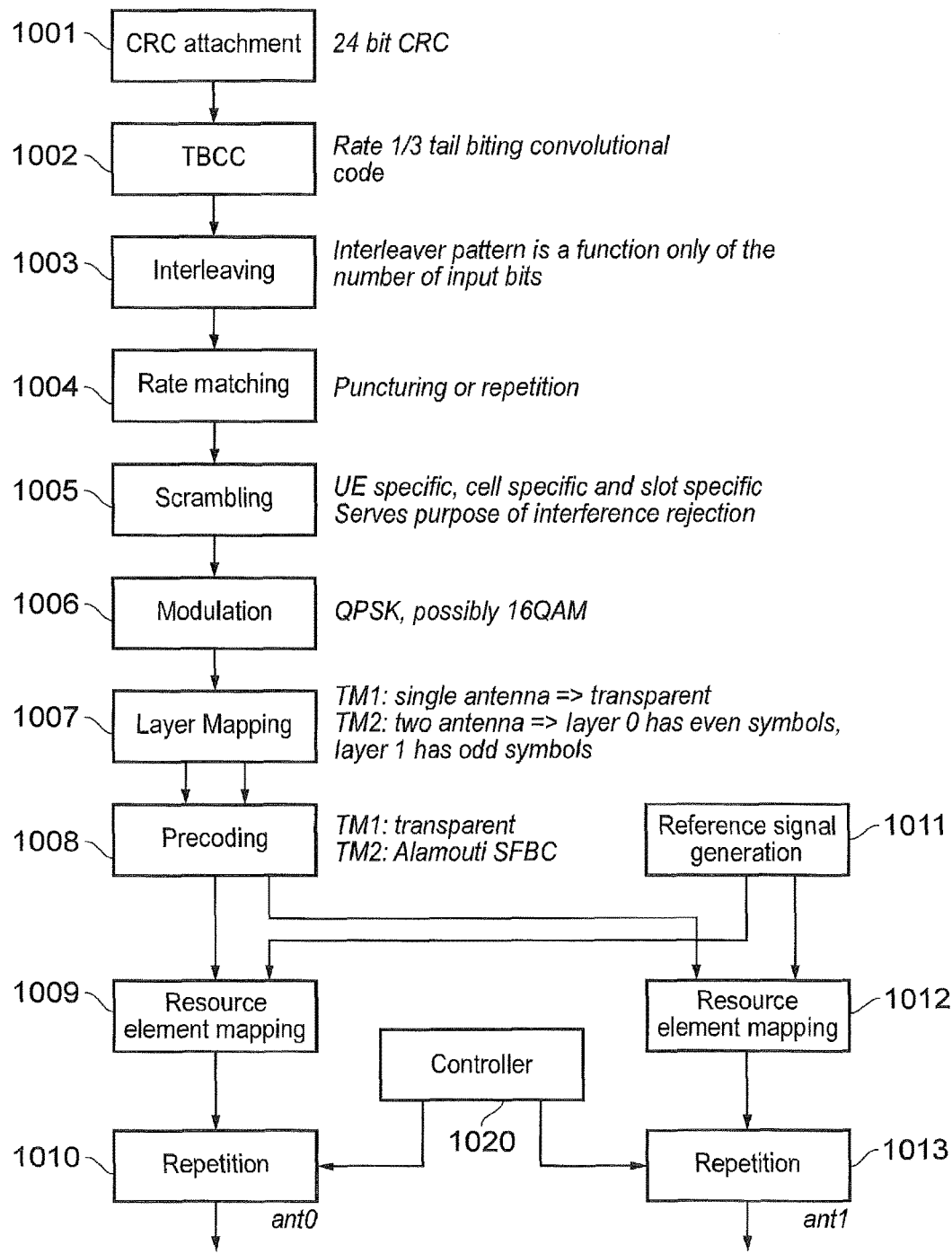
FIG. 10 shows a known implementation of the transport and physical channel processing chain.

A known implementation of the transport and physical channel processing applied to the narrowband physical downlink shared channel (NB-PDSCH) and narrowband physical downlink control channel (NB-PDCCH) is shown in FIG. 10. A signal is appended with a 24-bit CRC 1001 for error detecting purposes, before being encoded in accordance with a tail biting convolutional code (TBCC) 1002 with a mother coding rate of 1/3, for error correcting purposes. The signal is interleaved 1003, where the interleaver pattern is a function only of the number of input bits to the processing chain, and rate matching is carried out 1004 in the form of puncturing or repetition, depending on the current number of bits in the signal and the number of modulation symbols to which the data will be mapped. The signal is then scrambled 1005. This is done separately for each UE, cell and frequency or time slot, and serves a purpose of interference rejection. The signal is modulated 1006 in accordance with, for example, a QPSK or 16QAM modulation scheme, and layer mapped 1007 in accordance with a first transmission mode using a single antenna and a second transmission mode using two antennas; one of which will have even-indexed modulation symbols mapped to layer 0 and the other will have odd-indexed modulation symbols mapped to layer 1. The signal is then precoded 1008, where in the case of the second transmission mode using two antennas, an Alamouti space-frequency block code is employed. The repetition function 1010, 1013 is applied after resource element mapping 1009, 1012, which also receives an input reference signal 1011. A controller 1020 controls the repetition function to extract (from its input bit stream) those resource elements that are to be transmitted in a particular sub-frame. For example, referring to the transmit sequence of FIG. 9 the controller controls the repetition function to transmit the set of physical channel bits labelled 'A' in sub-frames 1 to 3; labelled 'B' in sub-frames 4 to 6 and labelled 'C' in sub-frames 7 to 9.

Transport Chain Using Repetition

Embodiments of the present technique can provide an arrangement in which a mobile communications device or UE 104 can operate to communicate in a wireless communications system via a base station or infrastructure equipment. According to an embodiment of the present technique, a communications device comprises a transmitter configured to transmit signals to an infrastructure equipment of a wireless communications network in accordance with a wireless access interface provided by the infrastructure equipment. The communications device also comprises a controller configured to control the transmitter to transmit data to the infrastructure equipment via an uplink of the wireless access interface, wherein the wireless access interface includes communications resources for allocation to the communications device on the uplink, the communications resources comprising frequency resources, and time resources in which the wireless access interface is divided into predetermined time-divided units. The communications device is configured to divide an encoded transport block of data into a plurality of sub-units for transmission in a plurality of the time-divided units and one or more of the frequency resources of the wireless access interface allocated to the communications device. The communications device is next configured to transmit each sub-unit a repeated number of times within a repetition cycle. The communications device is further configured to transmit each sub-unit the repeated number of times in one or more subsequent repetition cycles, each sub-unit being transmitted the repeated number of times whereby the infrastructure equipment can combine the same sub-unit within each repetition cycle to form a composite sub-unit for each of the repetition cycles for recovering the transport block. Embodiments of the present technique allow a UE receiver to perform symbol combining, cross subframe channel estimation and early termination when repetition is used for TBs requiring TTIs of greater than 1 subframe. This is because repeated transmission of the sub-units can allow a receiver to accumulate signal energy for each received symbol to increase a signal-to-noise ratio in order to be able to decode a transport block. Furthermore, because sub-units are transmitted repeatedly in each of one or more repetition cycles a receiver can terminate a reception process early, if the receiver is able to decode the encoded transport block after one or more of the repetition cycles without requiring all of the repetition cycles over which an encoded data unit is transmitted depending upon radio reception conditions.

An example embodiment of the present technique can therefore be provided by adapting the receiver shown in FIG. 6 so that symbol combining is performed by the symbol combiner 602, followed by channel estimation 603 and equalization 604, combining each of the sub-units of the same portion (A, B, C) received within each repetition cycle, to form for each sub-unit A, B, C a composite sub-unit. The composite sub-units of the same section from each repetition cycle are then combined within the LLR combiner 605 and the decoder 606 to decode an encoded transport block.

Embodiments of the present technique may find application for example with NB-IoT in which frequency resources allocated to a NB-IoT device may be limited to only one physical resource block (PRB). As such transmission of large transport blocks may require a transmission time interval (TTI) of longer than that of a sub-frame.

It should be readily appreciated that embodiments of the present technique apply equally to downlink communications as they do to uplink communications. Therefore it is equally applicable for the infrastructure equipment (eNodeB) to divide and transmit the transport block to be received and recovered at the communications device (UE).

Figure 11A:
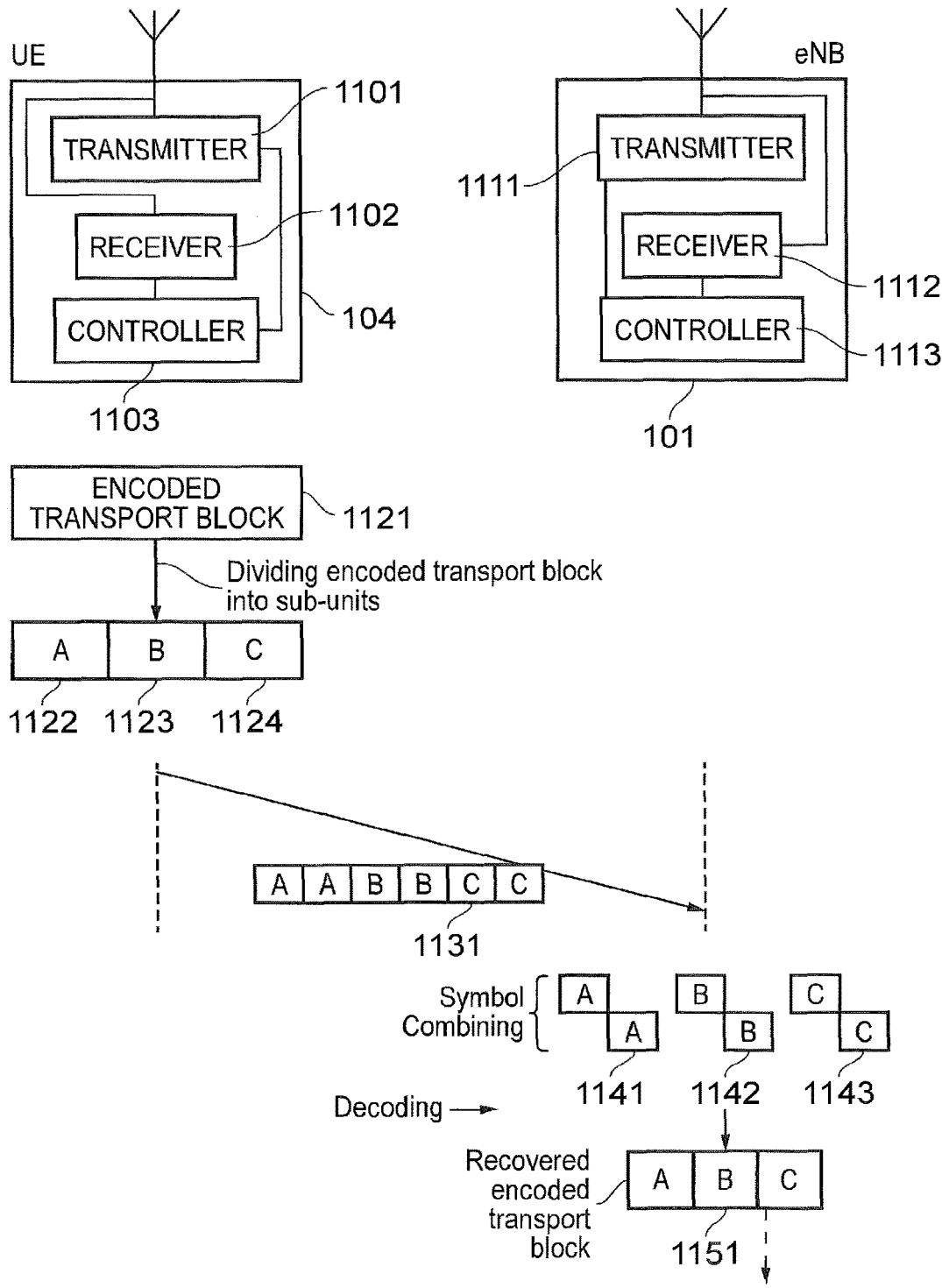
FIG. 11A is a part schematic block diagram of a communications device and an infrastructure equipment, and part message flow diagram illustrating a process of dividing and transmitting at the communications device a transport block such that it can be combined and recovered at the infrastructure equipment in accordance with the present technique.

FIG. 11A provides an example block diagram of a communications device or UE 104 and a base station or eNB 101 performing a message exchange in accordance with an embodiment of the present technique. In FIG. 11A the UE 104 is shown to transmit a transport block such that it can be combined and recovered at the eNB 101 in accordance with the present technique. As shown in FIG. 11A, a UE 104 includes a transmitter 1101 and a receiver 1102 which are controlled by a controller 1103. Correspondingly, the eNB 101 includes a transmitter 1111 and a receiver 1112 which are controlled by a controller 1113 which can also contain a scheduler function. As explained above, the UE 104 transmits and receives signals to and from the eNB 101 via frequency resources of a wireless access interface provided by the eNB as part of the wireless communications network.

FIG. 11A also illustrates a message exchange between the UE 104 and the eNB 101. The UE 104 is configured to divide an encoded transport block 1121 into a plurality of sub-units, which in this case are represented by "A" 1122, "B" 1123 and "C" 1124, in a number of time slots. The UE 104 is then configured to transmit each sub-unit of the divided encoded transport block 1131 to the eNB 101 a repeated number of times (in this example two times) within a first repetition cycle, and within one or more subsequent repetition cycles. The eNB 101 is then able to perform symbol combining on each of the sub-units 1141 to 1143 to form respective composite sub-units, and assembly of a received copy of the encoded transport block 1151 which can then be decoded by an error correction decoding function (e.g. a Turbo decoder) to decode the transport block.

Figure 11B:
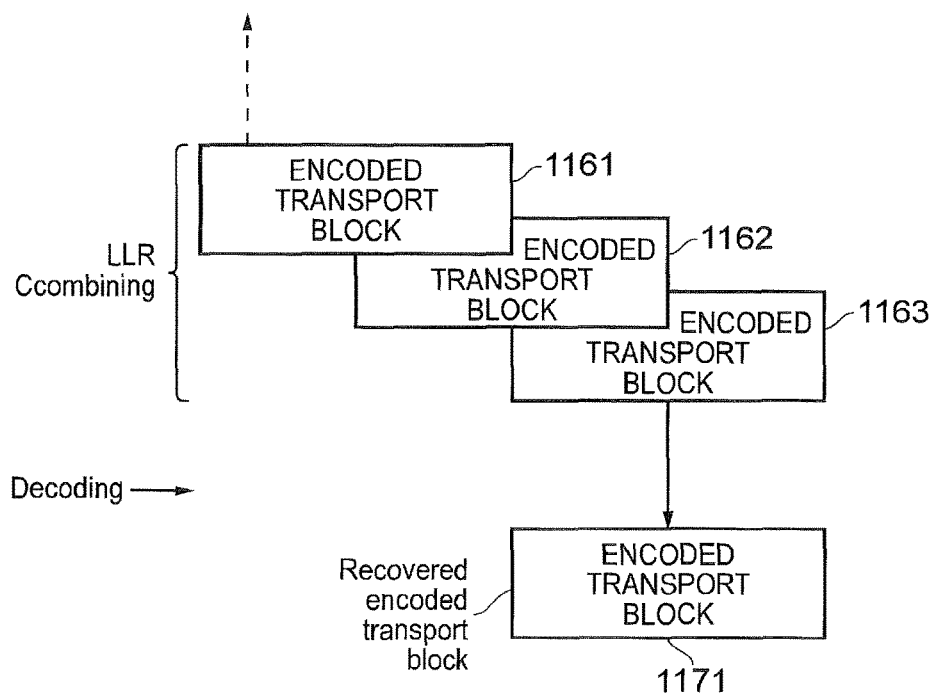
FIG. 11B shows how the message flow diagram of FIG. 11A may be continued to combine multiple composite sub-units at the infrastructure equipment to recover the transport block in accordance with the present technique.

FIG. 11B illustrates how the eNB 101 may then perform LLR combining to combine composite sub-units from different repetition cycles 1161 to 1163, and again decode to recover the transmitted transport block 1171.

Figure 12:
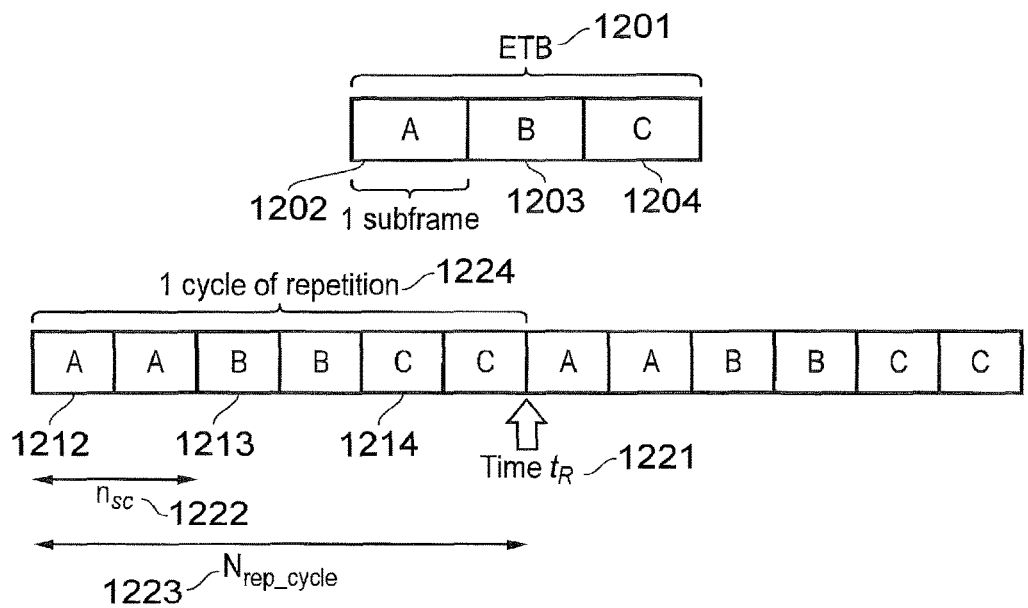
FIG. 12 illustrates an example of cyclical sub-frame repetition in accordance with at least one embodiment of the present technique.

Embodiments of the present technique can perform a cyclic sub-frame level repetition on an encoded TB with a TTI>1 sub-frame where each part (i.e. sub-frame) of the encoded TB is repeated a predefined number of times before the next part (sub-frame) is repeated by another predefined number of times. When the last part of the encoded TB has finished its predefined number of repetitions (over the number of sub-frames labelled '$N_{rep\_cycle}$' in FIG. 7), the parts are cycled, i.e. the $1^{st}$ part of the encoded TB is repeated. This is continued until the total number of repetitions for each part is completed. An example is shown in FIG. 12, where the number of repetitions required is four for the encoded TB 1201. The encoded TB, ETB, is broken up into parts (i.e. individual sub-frames 1202 to 1204) and a repeat cycle 1224, or cycle of repetition, would consist of two repetitions of each sub-frame 1212 to 1214. For example for the case where the frequency tracking capability of the UE is sufficient to maintain phase accuracy for only two sub-frames, then symbol combining may only produce an improvement in a likelihood of correct reception over only two sub-frames. This is labelled '$n_{SC}$' in FIG. 12 and indicates the number of sub-frames over which symbol combining can be performed, and hence the number of sub-frames over which the same string of symbols is repeated. The repeat cycle would be repeated twice (two cycles of repetition 1224) and labelled '$n_{rep\_cycle}$' 1223 in FIG. 12 to give a total of four repetitions for the overall encoded TB, ETB. It can be appreciated that if the receiver (e.g. UE) requires only two repetitions, it can decode the TB at time $t_R$ 1221. The number of repetitions of each subframe in each repeat cycle can be set according to the number of sub-frames over which cross-subframe channel estimation is possible and/or the number of subframes over which phase accuracy can be expected between transmitter and receiver. A typical number would be four sub-frames; FIG. 12 shows each subframe being repeated twice.

In an embodiment of the present technique, the parameter $n_{SC}$ is fixed in the specifications, and therefore is predetermined.

In an embodiment of the present technique, the parameter $n_{SC}$ is a function of the number of repetitions of the transport block. The relationship between $n_{SC}$ and the number of repetitions can be fixed in the specifications and therefore predetermined, or signalled to the UE by the eNodeB. An example relationship may be:

For small numbers of repetitions, $n_{SC}=1$, allowing the UE to perform early termination even for small numbers of repetitions.

For intermediate numbers of repetitions, $n_{SC}=4$, allowing the UE to perform early termination of repetitions while allowing the UE to achieve the greatest possible cross-sub-frame channel estimation gain.

For large numbers of repetitions, $n_{SC}=2$. Large numbers of repetitions are applied at extremes of coverage (in poor SNR conditions). In these cases, the frequency tracking error of the UE is expected to be high and the UE will not be able to perform symbol combining over a large number of sub-frames, hence there is no need for a large value of $n_{SC}$.

In an embodiment of the present technique, the number of repetitions $n_{SC}$ can be different for different parts (or sub-frame) of the encoded TB, ETB. For the example in FIG. 12, "A" can, for example, be repeated two times, "B" can be repeated three times and "C" can be repeated four times. Such an arrangement may be advantageous is the different portions (A, B, C) have different reliability requirements, e.g. associated with some portions containing systematic bits and some portions containing parity bits; or some portions being associated with critical bits from a voice or video codec.

In an embodiment of the present technique, $n_{SC}$ can be different in different repetition cycles, for example in the first cycle $n_{SC}$ can be two times, in the $2^{nd}$ cycle $n_{SC}$ can be three times and in a $3^{rd}$ cycle $n_{SC}$ can be 4 times In an embodiment of the present technique, the UE signals to the eNodeB information regarding its current capability to perform symbol combining. In this case, the eNodeB can configure a value of $n_{SC}$ that is appropriate for the current capability of the UE. For example, if the UE determines that it is observing a rapidly changing channel, it may signal to the eNodeB that it has limited capability to perform symbol combining.

In an embodiment of the present technique, the UE transmits pilot or sounding signals to the eNodeB and the eNodeB determines the symbol combining capability of the UE from the reception of these signals. For example, the UE may transmit sounding reference signals (SRS) and the eNodeB determines the rate of change of the received SRS. If the received SRS change rapidly either due to a rapidly changing channel or due to a significant frequency tracking error at the UE, the eNodeB can use a small value of $n_{SC}$. Conversely, if the received SRS do not change rapidly, the eNodeB can use a relatively larger value of $n_{SC}$.

In an embodiment of the present technique, the eNodeB implements a control loop that monitors the decoding performance of the UE (e.g. the block error rate of the UE) and adjusts the $n_{SC}$ parameter in order to optimise that decoding performance.

Figure 13:
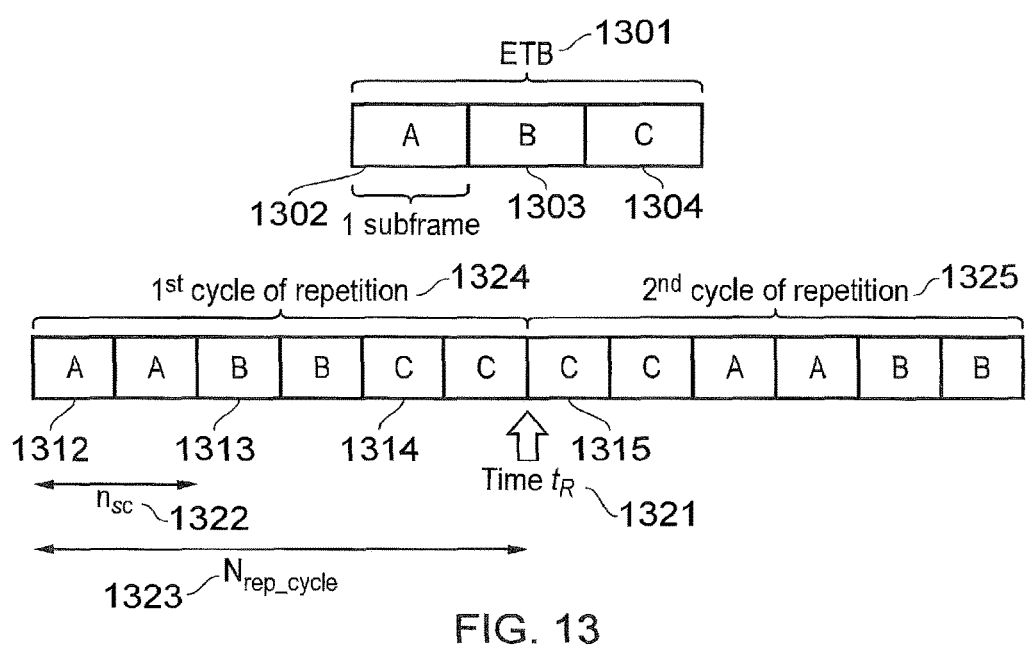
FIG. 13 illustrates an example of cyclical sub-frame repetition in which the repetition pattern may be changed in accordance with at least one embodiment of the present technique.

In an embodiment of the present technique, the order in which parts of the transport block are cycled is changed for each cycle of repetition. This is shown in FIG. 13. Referring to an example in the downlink, this mode of operation may be advantageous for the case where there is periodic interference or noise affecting the UE, since the same physical bits do not suffer the same periodic interference in each cycle of repetition. This noise could be generated externally to the UE, e.g. through interfering signals transmitted by a neighbouring base station or through spinning machines (e.g. turbines) causing periodic RF transmissions to be generated or reflected in the direction of the UE). Alternatively, the noise could be generated internally to the UE, for example in the case where a sensor in the UE periodically performs measurements leading to periodic electromagnetic interference.

In FIG. 13, an encoded TB 1301 is split into three sub-frames, "A" 1302, "B" 1303 and "C" 1304. In a first cycle of repetition 1324, of length $N_{rep\_cycle}$ 1323 and when there are two repetitions of each sub-frame 1322, sub-frame "A" 1312 is repeated twice, then sub-frame "B" 1313 and finally sub-frame "C" 1314. In a second cycle of repetition 1325 however, following time $t_R$ it is sub-frame "C" 1315 which is repeated and transmitted first.

In a most general case, sub-frames do not need to be repeated according to a "cycle of repetition", for example as illustrated by the cycle of repetition shown in FIG. 12 and FIG. 13. Instead of a "cycle of repetition", the repeated sub-frames could be repeated according to a known pattern. For example if the known pattern is "ABBCAC", the actual sub-frames transmitted would be "AABBBBCCAACC". Note that FIG. 12 is a subset of this general case (where the known pattern is "ABCABC") and FIG. 13 is also a subset (where the known pattern is "ABCCAB"). The specific cases of FIG. 12 and FIG. 13 may be preferable since at the end of each cycle of repetition, the UE has received all physical bits from repetition of the transport block. However it is noted that these are simply specific cases of the general case discussed in this paragraph.

In an embodiment of the present technique, the signal can be modified during each cycle of repetition. For example:
- Different precoding weight vectors can be applied to the transmissions in different cycles of repetition. This mode of operation can improve antenna or beamforming diversity when the multiple repetitions are finally decoded by the UE.
- A different scrambling sequence can be applied to the parts of the encoded TB in each cycle of repetition. For example, the part of the encoded TB labelled "A" in the first cycle of repetition can be scrambled with sequence S1 and scrambled with sequence S2 in the second cycle of repetition. This scrambling could provide the following benefits:
  - Allow the UE to determine which "cycle of repetition" it is currently decoding (through a blind decoding process).
  - Allow scrambling of the repeated transmissions to identify the UE. For example in cases where the NB-PDSCH is assigned directly to a UE (without an associated NB-PDCCH), the changing scrambling sequences may be used to (at least partially) identify the UE to which the NB-PDSCH is transmitted.

Figure 14:
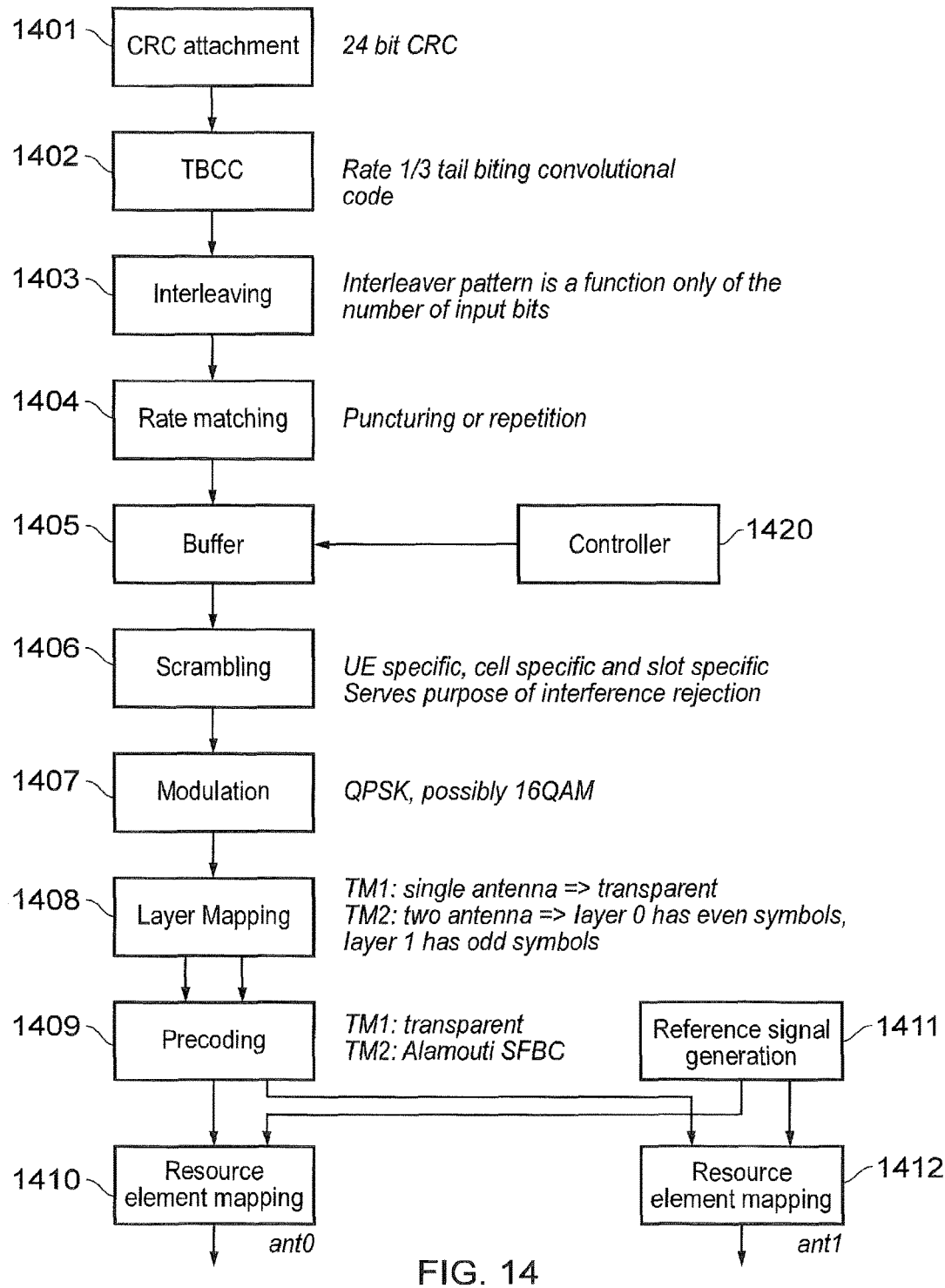
FIG. 14 shows an implementation of a transport processing chain in accordance with at least one embodiment of the present technique.

FIG. 14 shows an implementation of a downlink transport channel processing chain according to an example embodiment of the present technique. A signal is appended with a 24-bit CRC 1401 for error detecting purposes, before being encoded in accordance with a tail biting convolutional code (TBCC) 1402 with a mother coding rate of 1/3, for error correcting purposes. The signal is interleaved 1403, where the interleaver pattern is a function only of the number of input bits to the processing chain, and rate matching is carried out 1404 in the form of puncturing or repetition, depending on the current number of bits in the signal and the number of modulation symbols to which the data will be mapped. Unlike in the processing chain of FIG. 10, before the signal is then scrambled 1406, it is buffered 1405. The buffer is controlled by a controller 1420, which controls the buffer to output a subset of the bits produced by the rate matching function 1404. The scrambling 1406 is done separately for each UE, cell and frequency or time slot, and serves a purpose of interference rejection. The signal is modulated 1407 in accordance with, for example, a QPSK or 16 QAM modulation scheme, and layer mapped 1408 in accordance with a first transmission mode using a single antenna and a second transmission mode using two antennas; one of which will have even-indexed modulation symbols mapped to layer 0 and the other will have odd-indexed modulation symbols mapped to layer 1. The signal is then precoded 1409, where in the case of the second transmission mode using two antennas, an Alamouti space-frequency block code is employed, and along with a reference signal 1411, is mapped to resource elements 1410, 1412.

Specifically, referring to the pattern of physical bits that are transmitted according to FIG. 12, and labelling the subframes from left to right as subframes 0, 1, . . . 11, the controller divides the bits produced by the rate matching function into three groups of bits: group A, group B and group C. For example, considering the case where the rate matching function produces 600 bits, in which a 276 bit transport block has a 24 bit CRC appended 1401, is coded by a 1/3 rate TBCC 1402 and the coded bits are rate matched 1404 to produce a rate 1/2 code, then the groups would comprise:
- Group A consists of physical bits {0 . . . 199}
- Group B consists of physical bits {200 . . . 399}
- Group C consists of physical bits {400 . . . 599}

In this example, the controller 1420 controls the buffer 1405 to output:
- Group A physical bits in sub-frames 0, 1, 6, 7
- Group B physical bits in sub-frames 2, 3, 8, 9
- Group C physical bits in sub-frames 4, 5, 10, 11

It should be noted that the groups of 200 physical bits in the above example can be mapped to 100 resource elements modulated using QPSK.

Figure 15:
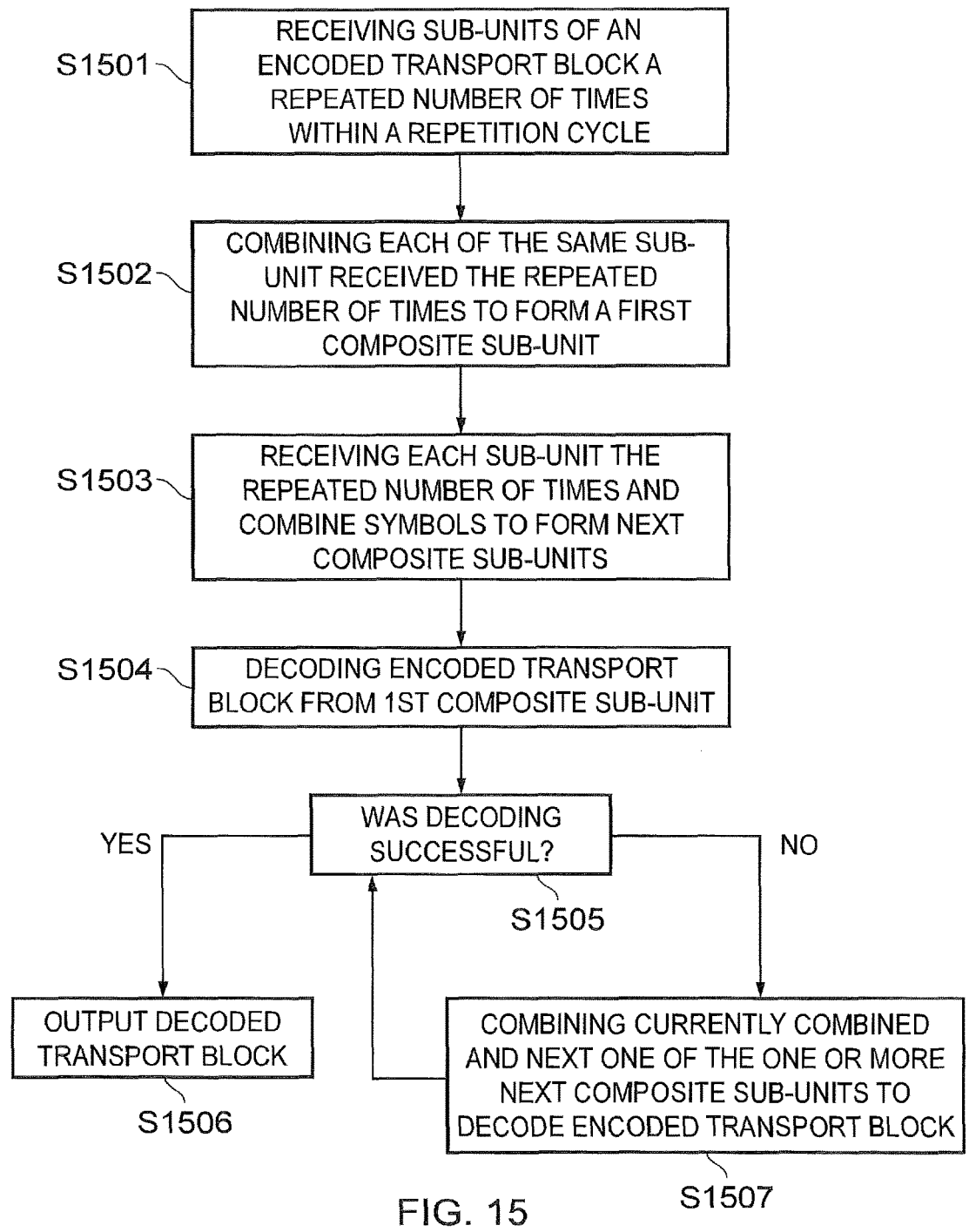
FIG. 15 is a flow diagram illustrating an example process in which a communications device may carry out a method of cyclical sub-frame repetition in accordance with the present technique.

FIG. 15 is a flow diagram illustrating an example process in which a communications device may carry out a method of cyclical sub-frame repetition in accordance with the present technique. In step S1501, a communications device (UE) or an infrastructure equipment (eNodeB) receives a plurality of sub-units of an encoded transport block a repeated number of times within a repetition cycle. In step S1502, the UE or eNodeB combines each of the same sub-unit received the repeated number of times within one or more subsequent repetition cycles to form a first composite sub-unit. In step S1503, the UE or eNodeB receives each sub-unit the repeated number of times and combines them to form one or more subsequent composite sub-units. In step S1504, the UE or eNodeB attempts to decode the transport block from the first composite sub-unit, and determines in step S1505 whether this decoding was successful. If it was successful, then the UE or eNodeB outputs the decoded transport block in step S1506. If however, it was not successful, then in step S1507, the UE or eNodeB combines the currently combined composite sub-unit (the first composite sub-unit on the first cycle of step S1507) with the next of the one or more subsequent composite sub-units, and attempts to decode the transport block. Alternatively, the UE or eNodeB in step S1507 may wait to attempt decoding again until more than one of the next of the subsequent composite sub-units, should there be more than one, have been combined with the currently combined composite sub-unit. Alternatively, the UE or eNodeB may wait to attempt decoding again until after a certain number of repetition cycles rather than after a certain number of combinations of composite sub-units. With this alternative the UE can avoid combining sub-units if it knows that it has correctly decoded the transport block.

Again, the UE or eNodeB in step S1505 determines whether decoding was successful, and continues looping between step S1505 and S1507 until decoding is successful and the transport block can be outputted in step S1506.

As will be appreciated from the above description, the flowchart of FIG. 15 shows the receiver (UE or eNodeB) creating composite sub-units and then attempting to decode a transport block after receiving as small a number of sub-units as possible. The receiver therefore forms composite sub-units, tries to decode it and if it fails then combines further received sub-units into the composite sub-unit until it successfully decodes the sub-unit etc.

In previously described embodiments, cases have been considered where the string of physical bits is divided into an integer number of sections (labelled A, B, C). In an alternative embodiment, the buffer 1405 of FIG. 14 is a circular buffer and the controller controls the buffer to produce a known number of bits from the circular buffer. For example, in the case where the rate matching function produces 500 physical bits that are mapped to 10 sub-frames, the controller controls the buffer to produce the following groups of bits displayed in the table below.

| Sub-frame number | Physical bits |
|---|---|
| 0, 1 | 0 . . . 199 |
| 2, 3 | 200 . . . 399 |
| 4, 5 | 400 . . . 499; 0 . . . 99 |
| 6, 7 | 100 . . . 299 |
| 8, 9 | 300 . . . 499 |

In the above table, the UE can perform symbol combining across pairs of sub-frames (e.g. across sub-frames 0 and 1).

In the prior art, TTI bundling is used, where a large TBS is transmitted using a fixed number of redundancy versions. Each redundancy version is a coded version of a transport block occupying a TTI (1 ms or 1 sub-frame). Each redundancy version contains a different set of parity bits and it is designed to be independently decoded. If the receiver is in a poor radio condition, it can accumulate multiple redundancy versions so that it has more redundancy bits, thereby achieving a lower coding rate. In Release-13 eMTC PUSCH transmission, each redundancy version is repeated four times followed by the next redundancy version until the last redundancy version is repeated four times then the cycle is repeated until the number of repetitions are completed.

Implementation of redundancy version repetition can contain a rate matching function with a circular buffer from which different redundancy versions are extracted. In this case, a single redundancy version is transmitted within a single TTI.

In embodiments of the present disclosure, different sets of physical bits are transmitted in different sub-frames within the TTI. Differences between long TTI repetition, as described in the present technique, and redundancy version repetition include:

Each redundancy version in the prior art (redundancy repetition) is designed to be independently decoded whilst according to embodiments of the present technique each part of the group of bits (i.e. group A, B or C) is not expected to be independently decoded (and it is expected that all parts are needed in order to be decoded).

The number of redundancy versions in the prior art is fixed regardless of the size of the TB. In long TTI repetition, the length of the TTI depends on the size of the TB. The larger the TBS (Transport Block Size), the longer (i.e. more sub-frames) is the TTI. Hence in long TTI repetition the duration of the repetition cycle depends on the TBS and hence the number of groups of bits varies as a function of the TBS (for a small TBS, only one group of bits, group A is required; for a larger TBS, three groups of bits, A,B,C may be required; for a very large TBC, many groups, A, B, C, . . . X, Y, Z, may be required).

Some channel bits are repeated more than others when using redundancy versions since the number of redundancy versions is fixed and might not perfectly divide the number of sub-frames allocated to the UE. In contrast long TTI repetition maps the rate matched bits to an amount of physical resource that is an integer multiple of the number of rate matched bits, hence the channel bits are repeated equally when long TTI repetition is applied.

The following numbered paragraphs provide further example aspects and features of the present technique:

Paragraph 1. A communications device comprising
a transmitter configured to transmit signals to an infrastructure equipment of a wireless communications network in accordance with a wireless access interface provided by the infrastructure equipment, and
a controller configured to control the transmitter to transmit data to the infrastructure equipment via an uplink of the wireless access interface, wherein the wireless access interface includes communications resources for allocation to the communications device on the uplink, the communications resources comprising frequency resources, and time resources in which the wireless access interface is divided into predetermined time-divided units and the controller is configured in combination with the transmitter
to divide an encoded transport block of data into a plurality of sub-units for transmission in a plurality of the time-divided units and one or more of the frequency resources of the wireless access interface allocated to the communications device,
to transmit each sub-unit a repeated number of times within a repetition cycle, and
to transmit each sub-unit the repeated number of times in one or more subsequent repetition cycles, each sub-unit being transmitted the repeated number of times whereby the infrastructure equipment can combine the same sub-unit within each repetition cycle to form a composite sub-unit for each of the repetition cycles for recovering the transport block.

Paragraph 2. A communications device according to paragraph 1, wherein one or more of the composite sub-units from different repetition cycles can be combined when decoding to recover the transport block.

Paragraph 3. A communications device according to paragraph 1 or 2, wherein the repeated number of times of transmission of the sub-units is dynamically configured.

Paragraph 4. A communications device according to paragraph 3, comprising a receiver configured to receive signals transmitted by the infrastructure equipment wherein the receiver is configured to receive an indication of the repeated number of times of transmission of the sub-units dynamically configured by the infrastructure equipment.

Paragraph 5. A communications device according to paragraph 4, wherein the indication of the repeated number of times of transmission of the sub-units received from the infrastructure equipment is in response to a channel status for receiving the signals transmitted by the transmitter at the infrastructure equipment.

Paragraph 6. A communications device according to any of paragraphs 1 to 5, the repeated number of times of transmission of the sub-units is predetermined.

Paragraph 7. A communications device according to any of paragraphs 1 to 6, wherein the repeated number of times of transmission of each sub-unit is different for different repetition cycles.

Paragraph 8. A communications device according to any of paragraphs 1 to 7, wherein an order of transmission of the sub-units within the first repetition cycle is different to an order of transmission within one or more of the subsequent repetition cycles.

Paragraph 9. A communications device according to any of paragraphs 1 to 8, wherein the sub-units in each repetition cycle are scrambled before transmission, the sub-units in one repetition cycle having a different scrambling sequence applied to them during the scrambling than sub-units in a subsequent repetition cycle.

Paragraph 10. A communication device according to any of paragraphs 1 to 9, wherein data symbols of the sub-units in each repetition cycle are precoded by multiplying the data symbols with a weighting vector before transmission from one or more antenna of the transmitter, the sub-units in one repetition cycle having a different weight vector than sub-units in a subsequent repetition cycle.

Paragraph 11. An infrastructure equipment of a mobile communications network configured to receive signals from a communications device, the infrastructure equipment comprising a receiver configured to receive signals transmitted by the communications device in accordance with a wireless access interface, and a controller configured to control the receiver to receive data via an uplink of the wireless access interface, and the controller is configured in combination with the receiver to receive a plurality of sub-units of an encoded transport block of data in a plurality of time-divided units within frequency resources of the wireless access interface allocated to the communications device, each of the sub-units being received a repeated number of times within a repetition cycle, and to combine the same sub-unit received the repeated number of times to form a composite sub-unit to recover the transport block.

Paragraph 12. An infrastructure equipment according to paragraph 11, wherein the repetition cycle is a first repetition cycle and the repeated number of times each sub-unit is transmitted in the first repetition cycle is a first repeated number of times and the receiver is configured to receive each sub-unit a repeated number of times in one or more subsequent repetition cycles, for each of the one or more subsequent repetition cycles to receive each of the sub-units the repeated number of times within the repetition cycle, to combine symbols of the same sub-unit received the repeated number of times for the sub-unit to form for the repetition cycle a composite sub-unit, and to recover the transport block from the composite sub-units by combining the composite sub-units formed from different repetition cycles when decoding.

Paragraph 13. An infrastructure equipment according to paragraph 11 or 12, wherein the transport block has been encoded with an error correction and/or detection code and the controller is configured in combination with the receiver to decode the transport block formed from the composite sub-units received from the first repetition cycle, to detect whether the transport block has been successfully decoded, and if successfully decoded to output the transport block, or if not successfully decoded to combine the composite sub-units formed from the one or more subsequent repetition cycles with the sub-units received from the first repetition cycle, and to decode the combined composite units of the transport block.

Paragraph 14. An infrastructure equipment according to any of paragraphs 11 to 13, wherein the detecting whether the transport block has been successfully decoded is configured to be carried out by the controller subsequently to each of a combination of the current combined composite sub-units and a composite sub-unit formed from a next one or more of the one or more subsequent repetition cycles.

Paragraph 15. An infrastructure equipment according to any of paragraphs 11 to 13, wherein the detecting whether the transport block has been successfully decoded is configured to be carried out by the controller subsequently to the sub-units of a next one or more of the subsequent repetition cycle being received.

Paragraph 16. A method of controlling communications at a communications device comprising a transmitter configured to transmit signals to an infrastructure equipment of a mobile communications network in accordance with a wireless access interface provided by the infrastructure equipment, the method comprising dividing an encoded transport block of data into a plurality of sub-units for transmission in a plurality of the time-divided units and one or more of the frequency resources of the wireless access interface allocated to the communications device, transmitting each sub-unit a repeated number of times within a repetition cycle, and transmitting each sub-unit the repeated number of times in one or more subsequent repetition cycles, each sub-unit being transmitted the repeated number of times whereby the infrastructure equipment can combine the same sub-unit within each repetition cycle to form a composite sub-unit for each of the repetition cycles for recovering the transport block.

Paragraph 17. A method of controlling communications at an infrastructure equipment of a mobile communications network configured to receive signals from a communications device, the method comprising receiving a plurality of sub-units of an encoded transport block of data in a plurality of time-divided units within one or more frequency resources of the wireless access interface allocated to the communications device, each of the sub-units being received a repeated number of times within a repetition cycle, and combining the same sub-unit received the repeated number of times to form a composite sub-unit to recover the transport block.

Paragraph 18. A communications device comprising a receiver configured to receive signals transmitted by an infrastructure equipment of a wireless communications network in accordance with a wireless access interface provided by the infrastructure equipment, and a controller configured to control the receiver to receive data via a downlink of the wireless access interface, wherein the wireless access interface includes communications resources for allocation to the communications device on the downlink, the communications resources comprising frequency resources, and time resources in which the wireless access interface is divided into predetermined time-divided units and the controller is configured in combination with the receiver to receive a plurality of sub-units of an encoded transport block of data in a plurality of time-divided units within frequency resources of the wireless access interface allocated to the communications device, each of the sub-units being received a repeated number of times within a repetition cycle, and to combine the same sub-unit received the repeated number of times to form a composite sub-unit to recover the transport block.

Paragraph 19. A communications device according to paragraph 18, wherein the repetition cycle is a first repetition cycle and the repeated number of times each sub-unit is transmitted in the first repetition cycle is a first repeated number of times and the receiver is configured to receive each sub-unit a repeated number of times in one or more subsequent repetition cycles, for each of the one or more subsequent repetition cycles to receive each of the sub-units the repeated number of times within the repetition cycle, to combine symbols of the same sub-unit received the repeated number of times for the sub-unit to form for the repetition cycle a composite sub-unit, and to recover the transport block from the composite sub-units by combining the composite sub-units formed from different repetition cycles when decoding Paragraph 20. A communications device according to paragraph 18 or 19, wherein the transport block has been encoded with an error correction and/or detection code and the controller is configured in combination with the receiver to decode the transport block formed from the composite sub-units, formed of combined symbols of the sub-units, received from the first repetition cycle, to detect whether the transport block has been successfully decoded, and if successfully decoded to output the transport block, or if not successfully decoded to combine the composite sub-units formed from the one or more subsequent repetition cycles with the sub-units received from the first repetition cycle, and to decode the combined composite units of the transport block.

Paragraph 21. A communications device according to paragraph 18, 19 or 20, wherein the communications device is configured to transmit to the infrastructure equipment a relative capability of the communications device, the relative capability being a capability of the communications device to combine repeated transmissions, and to receive an indication from the infrastructure equipment of the one or more of the repeated number of times of transmission of the sub units in accordance with the relative capability of the communications device.

Paragraph 22. A communications device according to any of paragraphs 18 to 21, wherein the detecting whether the transport block has been successfully decoded is configured to be carried out by the controller subsequently to each of a combination of the current combined composite sub-units and a composite sub-unit formed from a next one or more of the one or more subsequent repetition cycles.

Paragraph 23. A communications device according to any of paragraphs 18 to 22, wherein the detecting whether the transport block has been successfully decoded is configured to be carried out by the controller subsequently to the sub-units of a next one or more of the subsequent repetition cycle being received.

Paragraph 24. An infrastructure equipment of a mobile communications network configured to transmit signals to a communications device, the infrastructure equipment comprising a transmitter configured to transmit signals to the communications device in accordance with a wireless access interface, and a controller configured to control the transmitter to transmit data via a downlink of the wireless access interface, and the controller is configured in a combination with the transmitter to divide an encoded transport block of data into a plurality of sub-units for transmission in a plurality of the time-divided units and one or more of frequency resources of the wireless access interface allocated to the communications device, to transmit each sub-unit a repeated number of times within a repetition cycle, and to transmit each sub-unit the repeated number of times in one or more subsequent repetition cycles, each sub-unit being transmitted the repeated number of times whereby the communications device can combine the same sub-unit within each repetition cycle to form a composite sub-unit for each of the repetition cycles for recovering the transport block.

Paragraph 25. An infrastructure equipment according to paragraph 24, wherein one or more of the composite sub-units from different repetition cycles can be combined when decoding to recover the transport block.

Paragraph 26. An infrastructure equipment according to paragraph 24 or 25, wherein the repeated number of times of transmission of the sub-units is dynamically configured.

Paragraph 27. An infrastructure equipment according to any of paragraphs 24 to 26, comprising a receiver configured to receive signals transmitted by the infrastructure equipment wherein the receiver is configured to receive an indication of the repeated number of times of transmission of the sub-units dynamically configured by the communications device.

Paragraph 28. An infrastructure equipment according to any of paragraphs 24 to 27, wherein the indication of the repeated number of times of transmission of the sub-units received from the communications device is in response to a channel status for receiving the signals transmitted by the transmitter at the communications device.

Paragraph 29. An infrastructure equipment according to any of paragraphs 24 to 28, wherein the repeated number of times of transmission of the sub-units is predetermined.

Paragraph 30. An infrastructure equipment according to any of paragraphs 24 to 29, wherein the repeated number of times of transmission of each sub-unit is different for different repetition cycles.

Paragraph 31. An infrastructure equipment according to any of paragraphs 24 to 30, wherein an order of transmission of the sub-units within the first repetition cycle is different to an order of transmission within one or more of the subsequent repetition cycles.

Paragraph 32. An infrastructure equipment according to any of paragraphs 24 to 31, wherein the sub-units in each repetition cycle are scrambled before transmission, the sub-units in one repetition cycle having a different scrambling sequence applied to them during the scrambling than sub-units in a subsequent repetition cycle.

Paragraph 33. A communication device according to any of paragraphs 24 to 32, wherein data symbols of the sub-units in each repetition cycle are precoded by multiplying the data symbols with a weighting vector before transmission from the antenna ports of the transmitter, the sub-units in one repetition cycle having a different weight vector than sub-units in a subsequent repetition cycle.

Paragraph 34. A method of controlling communications at a communications device configured to transmit signals to and/or receive signals from an infrastructure equipment of a mobile communications network in accordance with a wireless access interface, the method comprising receiving a plurality of sub-units of an encoded transport block of data in a plurality of time-divided units within one or more frequency resources of the wireless access interface allocated to the communications device, each of the sub-units being received a repeated number of times within a repetition cycle, and combining the same sub-unit received the repeated number of times to form a composite sub-unit to recover the transport block.

Paragraph 35. A method of controlling communications at an infrastructure equipment of a mobile communications network configured to transmit signals to and/or receive signals from a communications device in accordance with a wireless access interface, the method comprising dividing an encoded transport block of data into a plurality of sub-units for transmission in a plurality of the time-divided units and one or more of the frequency resources of the wireless access interface allocated to the communications device, transmitting each sub-unit a repeated number of times within a repetition cycle, and transmitting each sub-unit the repeated number of times in one or more subsequent repetition cycles, each sub-unit being transmitted the repeated number of times whereby the communications device can combine the same sub-unit within each repetition cycle to form a composite sub-unit for each of the repetition cycles for recovering the transport block.

Annex 1:

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronization signals which are interspersed in the control and data regions in accordance with a predetermined pattern. The control region 204 may contain a number of physical channels for the transmission of control data, such as a physical downlink control channel PDCCH, a physical control format indicator channel PCFICH and a physical HARQ indicator channel PHICH. The data region may contain a number of physical channel for the transmission of data, such as a physical downlink shared channel PDSCH and a physical broadcast channels PBCH. Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control RRC signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information DCI, where resource allocations for a PDSCH are communicated in a preceding PDCCH instance in the same sub-frame. During a resource allocation procedure, UEs thus monitor the PDCCH for DCI addressed to them and once such a DCI is detected, receive the DCI and detect and estimate the data from the relevant part of the PDSCH.

Each uplink sub-frame may include a plurality of different channels, for example a physical uplink shared channel PUSCH 305, a physical uplink control channel PUCCH 306, and a physical random access channel PRACH. The physical Uplink Control Channel PUCCH may carry control information such as ACK/NACK to the eNodeB for downlink transmissions, scheduling request indicators SRI for UEs wishing to be scheduled uplink resources, and feedback of downlink channel state information CSI for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals DMRS 307 and sounding reference signals SRS 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information UCI on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69
[3] R1-157783, "Way Forward on NB-IoT," CMCC, Vodafone, Ericsson, Huawei, HiSilicon, Deutsche Telekom, Mediatek, Qualcomm, Nokia Networks, Samsung, Intel, Neul, CATR, AT&T, NTT DOCOMO, ZTE, Telecom Italia, IITH, CEWiT, Reliance-Jio, CATT, u-blox, China Unicom, LG Electronics, Panasonic, Alcatel-Lucent, Alcatel-Lucent Shanghai Bell, China Telecom, RAN1 #83

The invention claimed is:

1. A machine-type communications (MTC) device comprising:
a receiver configured to receive signals transmitted by an infrastructure equipment of a wireless communications network in accordance with a wireless access interface provided by the infrastructure equipment, wherein the MTC device is configured to operate within a limited bandwidth of the wireless access interface; and
circuitry configured to control the receiver to receive data via a downlink of the wireless access interface, wherein the wireless access interface includes communications resources for allocation to the MTC device on the downlink, the communications resources comprising frequency resources, and time resources in which the wireless access interface is divided into predetermined time-divided units, wherein
the circuitry is configured in combination with the receiver to
control transmitting, to the infrastructure equipment, a relative capability of the MTC device prior to receiving a plurality of sub-units of an encoded transport block, the relative capability being a capability of the communications device to combine repeated transmissions;
receive the plurality of sub-units of the encoded transport block of data in a plurality of time-divided units within a physical resource block of the wireless access interface allocated to the MTC device, each of the sub-units being received in the physical resource block a repeated number of times within a repetition cycle, and
combine a same sub-unit received the repeated number of times to form a composite sub-unit to recover the transport block.

2. The MTC device of claim 1, wherein the repetition cycle is a first repetition cycle and the repeated number of times each sub-unit is transmitted in the first repetition cycle is a first repeated number of times.

3. The MTC device of claim 2, wherein the receiver is configured to:
receive each sub-unit a repeated number of times in one or more subsequent repetition cycles; and
for each of the one or more subsequent repetition cycles to receive each of the sub-units a second repeated number of times.

4. The MTC device of claim 3, wherein
the circuitry is configured to combine symbols of the same sub-unit received the first and second repeated number of times for the sub-unit in the first repetition cycle and the one or more subsequent repetition cycles to form the composite sub-unit.

5. The MTC device of claim 1, wherein the transport block is encoded with at least one of an error correction and a detection code.

6. The MTC device of claim 1, wherein the circuitry is configured to decode the transport block formed from composite sub-units, formed of combined symbols of the sub-units, received from the repetition cycle.

7. The MTC device of claim 1, wherein the circuitry is configured to determine whether the transport block has been successfully decoded.

8. The MTC device of claim 7, wherein the circuitry is configured to output the transport block when it is determined that the transport block is successfully decoded.

9. The MTC device of claim 7, wherein the circuitry is configured to combine composite sub-units formed from one or more subsequent repetition cycles with the sub-units received from a first repetition cycle, and decode the combined composite units of the transport block when it is determined that the transport block is not successfully decoded.

10. The MTC device of claim 1, wherein the circuitry is configured to control receiving an indication from the infrastructure equipment of the one or more of the repeated number of times of transmission of the sub units in accordance with the relative capability of the MTC device.

11. The MTC device of claim 1, wherein the circuitry is configured to
determine whether the transport block has been successfully decoded subsequently to each of a combination of current combined composite sub-units and a composite sub-unit formed from a next one or more of one or more subsequent repetition cycles.

12. The MTC device of claim 1, wherein the circuitry is configured to determine whether the transport block has been successfully decoded subsequently to sub-units of a next one or more of a subsequent repetition cycle being received.

13. A method performed by a machine-type communications (MTC) device configured to operate within a limited bandwidth of a wireless access interface provided by infrastructure equipment, the method comprising:
receiving signals transmitted by the infrastructure equipment of a wireless communications network in accordance with a downlink of the wireless access interface provided by the infrastructure equipment, wherein the wireless access interface includes communications resources for allocation to the communications device on the downlink, the communications resources comprising frequency resources, and time resources in which the wireless access interface is divided into predetermined time-divided units;

transmitting, to the infrastructure equipment, a relative capability of the MTC device prior to receiving a plurality of sub-units of an encoded transport block, the relative capability being a capability of the MTC device to combine repeated transmissions;

receiving the plurality of sub-units of the encoded transport block of data in a plurality of time-divided units within a physical resource block of the wireless access interface allocated to the MTC device, each of the sub-units being received in the physical resource block a repeated number of times within a repetition cycle; and combining a same sub-unit received the repeated number of times to form a composite sub-unit to recover the transport block.

14. The method of claim 13, wherein the repetition cycle is a first repetition cycle and the repeated number of times each sub-unit is transmitted in the first repetition cycle is a first repeated number of times.

15. The method of claim 14, further comprising:
receiving each sub-unit a repeated number of times in one or more subsequent repetition cycles; and
for each of the one or more subsequent repetition cycles, receiving each of the sub-units a second repeated number of times.

16. The method of claim 15, further comprising:
combining symbols of the same sub-unit received the first and second repeated number of times for the sub-unit in the first repetition cycle and the one or more subsequent repetition cycles to form the composite sub-unit.

17. The method of claim 13, wherein the transport block is encoded with at least one of an error correction and a detection code.

18. The method of claim 17, further comprising:
decoding the transport block formed from composite sub-units, formed of combined symbols of the sub-units, received from the repetition cycle.

19. The method of claim 13, further comprising:
determining whether the transport block has been successfully decoded.

20. The method of claim 19, further comprising:
outputting the transport block when it is determined that the transport block is successfully decoded.

21. The method of claim 19, further comprising:
combining composite sub-units formed from one or more subsequent repetition cycles with the sub-units received from a first repetition cycle, and decoding the combined composite units of the transport block when it is determined that the transport block is not successfully decoded.

22. The method of claim 13, further comprising:
receiving an indication from the infrastructure equipment of the one or more of the repeated number of times of transmission of the sub units in accordance with the relative capability of the MTC device.

23. The method of claim 13, further comprising:
determining whether the transport block has been successfully decoded subsequently to each of a combination of current combined composite sub-units and a composite sub-unit formed from a next one or more of one or more subsequent repetition cycles.

24. The method of claim 13, further comprising:
determining whether the transport block has been successfully decoded subsequently to sub-units of a next one or more of a subsequent repetition cycle being received.

25. A machine-type communications (MTC) terminal comprising:
a receiver configured to receive signals transmitted by an infrastructure equipment of a wireless communications network in accordance with a wireless access interface provided by the infrastructure equipment, wherein the MTC device is configured to operate within a limited bandwidth of the wireless access interface and
the MTC terminal is configured to
control the receiver to receive data via a downlink of the wireless access interface, Wherein the wireless access interface includes communications resources for allocation to the communications device on the downlink, the communications resources comprising frequency resources, and time resources in which the wireless access interface is divided into predetermined time-divided units;
control transmitting, to the infrastructure equipment, a relative capability of the MTC terminal prior to receiving a plurality of sub-units of an encoded transport block, the relative capability being a capability of the communications device to combine repeated transmissions;
control the receiver to receive the plurality of sub-units of the encoded transport block of data in a plurality of time-divided units within a physical resource block of the wireless access interface allocated to the MTC terminal, each of the sub-units being received in the physical resource block a repeated number of times within a repetition cycle; and
combine a same sub-unit received the repeated number of times to form a composite sub-unit to recover the transport block.

26. A machine-type communication (MTC) terminal configured to operate within a limited bandwidth of a wireless access interface provided by infrastructure equipment, the MTC terminal comprising:
a transmitter configured to transmit, to infrastructure equipment, a relative capability of the MTC terminal prior to receiving a plurality of sub-units of an encoded transport block, the relative capability being a capability of the communications device to combine repeated transmissions;
a receiver configured to receive the plurality of sub-units of the encoded transport block of data in a plurality of time-divided units within a physical resource block of the wireless access interface allocated to the mobile terminal, each of the sub-units being received in the physical resource block a repeated number of times within a repetition cycle; and
circuitry configured to combine a same sub-unit received the repeated number of times to form a composite sub-unit to recover the transport block.

\* \* \* \* \*